(12) United States Patent
Zhou et al.

(10) Patent No.: US 12,526,709 B2
(45) Date of Patent: Jan. 13, 2026

(54) COMMUNICATION METHOD, TERMINAL DEVICE, AND STORAGE MEDIUM

(71) Applicant: HUAWEI TECHNOLOGIES CO., LTD., Guangdong (CN)

(72) Inventors: Ming Zhou, Shanghai (CN); Haw-Wei Shu, Shanghai (CN); Meng Meng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 382 days.

(21) Appl. No.: 18/043,337

(22) PCT Filed: Aug. 6, 2021

(86) PCT No.: PCT/CN2021/111306
§ 371 (c)(1),
(2) Date: Feb. 28, 2023

(87) PCT Pub. No.: WO2022/042265
PCT Pub. Date: Mar. 3, 2022

(65) Prior Publication Data
US 2023/0370920 A1 Nov. 16, 2023

(30) Foreign Application Priority Data
Aug. 28, 2020 (CN) .......................... 202010888823.8

(51) Int. Cl.
*H04W 36/06* (2009.01)
*H04W 36/00* (2009.01)
(Continued)

(52) U.S. Cl.
CPC ........ *H04W 36/06* (2013.01); *H04W 36/0011* (2013.01); *H04W 36/03* (2018.08);
(Continued)

(58) Field of Classification Search
CPC . H04W 36/06; H04W 36/0011; H04W 36/03; H04W 36/22; H04W 76/14;
(Continued)

(56) References Cited

U.S. PATENT DOCUMENTS

2012/0058735 A1* 3/2012 Vermani ............... H04L 5/0053
455/69
2013/0272283 A1* 10/2013 Jechoux ............ H04W 72/0446
370/338
(Continued)

FOREIGN PATENT DOCUMENTS

CN 111132352 * 5/2020
WO WO_2016187836 A1 * 12/2016
WO WO_2017028154 A1 * 2/2017

*Primary Examiner* — Nizar N Sivji

(57) ABSTRACT

This application provides a communication method, a terminal device, and a storage medium. The communication method includes: A first terminal device performs a Wi-Fi P2P service in response to a first operation of a user, where the first terminal device uses a first channel to perform the Wi-Fi P2P service, and a bandwidth of the first channel is a maximum bandwidth supported by the first terminal device, and is 80 MHz or 160 MHz. When detecting that a signal-to-noise ratio and/or a channel load of the first channel meet a first preset condition, the first terminal device switches from the first channel to a second channel to perform the Wi-Fi P2P service, where a bandwidth of the second channel is 20 MHz or 40 MHz.

17 Claims, 26 Drawing Sheets

(51) Int. Cl.
*H04W 36/22* (2009.01)
*H04W 76/14* (2018.01)
*H04W 84/12* (2009.01)

(52) U.S. Cl.
CPC .......... *H04W 36/22* (2013.01); *H04W 76/14* (2018.02); *H04W 84/12* (2013.01)

(58) Field of Classification Search
CPC ... H04W 84/12; H04W 36/304; H04W 92/18; H04W 4/08; H04W 4/80; H04W 76/23
See application file for complete search history.

(56) References Cited

U.S. PATENT DOCUMENTS

| | | | |
|---|---|---|---|
| 2019/0007130 A1* | 1/2019 | Fang | H04B 7/022 |
| 2019/0274054 A1* | 9/2019 | Salem | H04L 12/189 |
| 2020/0076552 A1* | 3/2020 | Cherian | H04L 5/0035 |
| 2021/0144239 A1* | 5/2021 | Barton | H04L 12/40189 |
| 2024/0073966 A1* | 2/2024 | Patil | H04W 74/0825 |
| 2025/0097725 A1* | 3/2025 | Yang | H04W 16/28 |

\* cited by examiner

COMMUNICATION METHOD, TERMINAL DEVICE, AND STORAGE MEDIUM

This application is a national stage of International Application No. PCT/CN2021/111306 filed on Aug. 6, 2021, which claims priority to Chinese Patent Application No. 202010888823.8 filed on Aug. 28, 2020. Both of the aforementioned applications are hereby incorporated by reference in their entireties.

TECHNICAL FIELD

Embodiments of this application relate to the field of communication technologies, and in particular, to a communication method, a terminal device, and a storage medium.

BACKGROUND

A wireless fidelity (wireless fidelity, Wi-Fi) technology is a widely used wireless network transmission technology. Currently, many application scenarios of a Wi-Fi service are a device to device (device to device, D2D) transmission mode between two peer user nodes. In Wi-Fi peer-to-peer communication, two devices establish a D2D link on a channel with a maximum bandwidth supported by the two devices, and exchange of service data is directly completed between the two devices. Generally, a service target with a high throughput and a low delay is required.

Wi-Fi communication uses a carrier sense multiple access with collision avoidance (carrier sense multiple access with collision avoidance, CSMA/CA) mechanism. When a plurality of Wi-Fi D2D links exist at the same time, the plurality of Wi-Fi D2D links work at the same time by using the CSMA/CA mechanism, causing frequent air interface contention and collision, and resulting in a long delay of the Wi-Fi service.

SUMMARY

Embodiments of this application provide a communication method, a terminal device, and a storage medium. The terminal device selects a narrow bandwidth channel, so as to reduce a probability of contending for a transmission resource with another terminal device on a same channel, and reduce a service transmission delay.

According to a first aspect, a communication method is provided, including: A first terminal device receives a first operation of a user, and the first terminal device performs a Wi-Fi P2P service in response to the first operation, where the first terminal device uses a first channel to perform the Wi-Fi P2P service, a bandwidth of the first channel is a maximum bandwidth supported by the first terminal device, and the maximum bandwidth is 80 MHz or 160 MHz; and when detecting that a signal-to-noise ratio and/or a channel load of the first channel meet a first preset condition, the first terminal device switches from the first channel to a second channel to perform the Wi-Fi P2P service, where a bandwidth of the second channel is 20 MHz or 40 MHz.

The communication method provided in the first aspect may be applied to a scenario in which a plurality of pairs of terminal devices simultaneously perform a Wi-Fi P2P service. Compared with that a plurality of pairs of terminal devices simultaneously occupy one relatively high bandwidth channel, a large bandwidth channel may be divided into a plurality of narrow bandwidth channels for use. The terminal device selects a narrow bandwidth channel based on a signal-to-noise ratio and/or a channel load of a channel, so as to reduce a probability of contending for a transmission resource with another terminal device on a same channel, reduce channel interference, and reduce a transmission delay of performing the Wi-Fi P2P service by the terminal device. In addition, concurrent communication between a plurality of pairs of terminal devices is implemented, and a throughput of an entire system is increased.

In a possible implementation, the second channel is a part of the first channel. Channel utilization is improved by selecting the second channel with a narrow bandwidth in a frequency range of the first channel to perform the Wi-Fi P2P service.

In a possible implementation, frequency ranges of the second channel and the first channel do not overlap. By selecting the second channel that does not overlap the frequency range of the first channel to perform the Wi-Fi P2P service, channel interference is further reduced, and a throughput of an entire system is increased.

In a possible implementation, a signal-to-noise ratio and/or a channel load of the second channel meet a second preset condition.

In a possible implementation, the method further includes: When detecting that a signal-to-noise ratio and/or a channel load of the second channel meet the first preset condition, and a signal-to-noise ratio and/or a channel load of a third channel meet a second preset condition, the first terminal device switches from the second channel to the third channel to perform the Wi-Fi P2P service, where a bandwidth of the third channel is 20 MHz or 40 MHz. The terminal device selects another narrow bandwidth channel based on the signal-to-noise ratio and/or the channel load of the channel to perform the Wi-Fi P2P service, which further reduces channel interference, and reduces the transmission delay of performing the Wi-Fi P2P service by the terminal device.

In a possible implementation, frequency ranges of the second channel and the third channel do not overlap. By selecting the third channel that does not overlap the frequency range of the second channel to perform the Wi-Fi P2P service, channel interference is further reduced, and a throughput of an entire system is increased.

In a possible implementation, the method further includes: When detecting that a signal-to-noise ratio and/or a channel load of the second channel meet the first preset condition, and a signal-to-noise ratio and/or a channel load of a fourth channel meet a second preset condition, the first terminal device switches from the second channel to the fourth channel to perform the Wi-Fi P2P service, where a bandwidth of the fourth channel is the maximum bandwidth. The terminal device reselects a high bandwidth channel based on the signal-to-noise ratio and/or the channel load of the channel to perform the Wi-Fi P2P service, thereby improving performance of the Wi-Fi P2P service.

In a possible implementation, the fourth channel and the first channel are a same channel.

In a possible implementation, the method further includes: The first terminal device receives first information broadcast by a second terminal device, where the second terminal device is another terminal device that performs the Wi-Fi P2P service in a Wi-Fi network except the first terminal device, and the first information is used to indicate a channel used by the second terminal device. The first terminal device may determine, by receiving the first information, a quantity of established Wi-Fi peer-to-peer communication links in each channel, and a quantity or a quantity of pairs of terminal devices that perform the Wi-Fi P2P service in each channel, so as to determine an idle degree of each channel, and provide an accurate basis for subsequently switching a channel by the first terminal device.

In a possible implementation, the first information is carried in a beacon frame broadcast by the second terminal device, or the first information is carried in a Bluetooth broadcast frame broadcast by the second terminal device.

In a possible implementation, the method further includes: The first terminal device obtains, based on the first information, a quantity of terminal devices that perform the Wi-Fi P2P service on the second channel; and if the first terminal device determines that the quantity of terminal devices that perform the Wi-Fi P2P service on the second channel is greater than or equal to a first threshold, and a quantity of terminal devices that perform the Wi-Fi P2P service on a fifth channel is less than the first threshold, the first terminal device switches from the second channel to the fifth channel to perform the Wi-Fi P2P service. The terminal device selects an idle channel to perform the Wi-Fi P2P service, which reduces a probability of contending for a transmission resource with another terminal device on a same channel, and reduces a transmission delay of performing the Wi-Fi P2P service by the terminal device.

In a possible implementation, the method further includes: The first terminal device broadcasts second information, where the second information is used to indicate a channel used by the first terminal device.

In a possible implementation, the Wi-Fi P2P service is a projection service or a file sharing service.

In a possible implementation, the first channel and the second channel are Wi-Fi 5G channels.

According to a second aspect, an apparatus is provided, including: a unit or a means (means) configured to perform the steps in the first aspect.

According to a third aspect, a terminal device apparatus is provided, including a processor, configured to be connected to a memory, and configured to invoke a program stored in the memory, so as to perform the method provided in the first aspect. The memory may be located inside or outside the apparatus. There are one or more processors, and there are one or more memories.

According to a fourth aspect, a program is provided, where the program is used to perform the method in the first aspect when being executed by a processor.

According to a fifth aspect, an embodiment of this application provides a computer-readable storage medium. The computer-readable storage medium stores instructions. When the instructions run on a computer or a processor, the method provided in the first aspect is implemented.

According to a sixth aspect, an embodiment of this application provides a program product, where the program product includes a computer program, the computer program is stored in a readable storage medium, at least one processor of a device may read the computer program from the readable storage medium, and the at least one processor executes the computer program so that the device implements the method provided in the first aspect.

DESCRIPTION OF EMBODIMENTS

The following describes embodiments of this application with reference to accompanying drawings.

Figure 1:
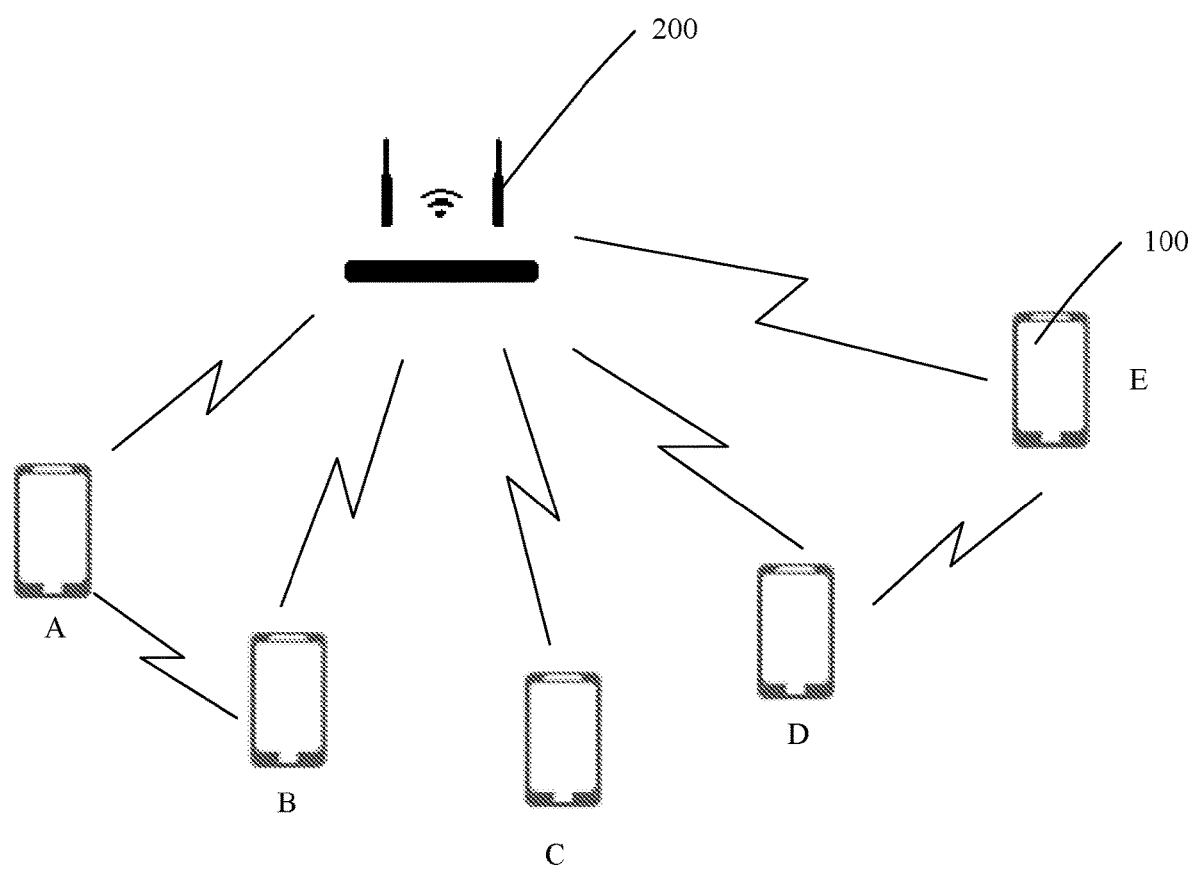
FIG. 1 is a schematic diagram of an application scenario applicable to an embodiment of this application.
Figure 2:
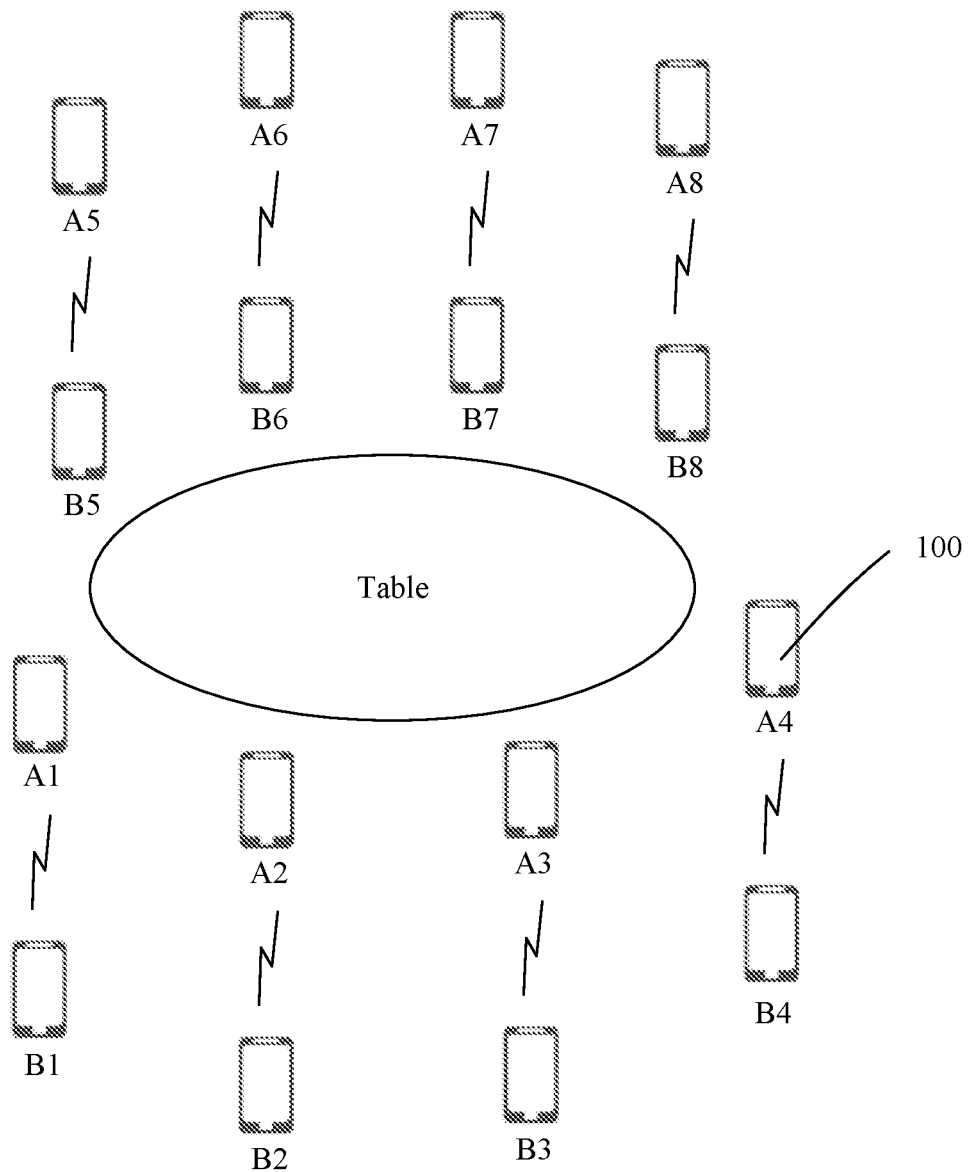
FIG. 2 is another schematic diagram of an application scenario applicable to an embodiment of this application.

A communication method provided in an embodiment of this application may be applied to a scenario in which a plurality of pairs of terminal devices perform Wi-Fi peer-to-peer communication in an environment. For example, FIG. 1 is a schematic diagram of an application scenario applicable to an embodiment of this application. As shown in FIG. 1, the application scenario includes five terminal devices 100 and a terminal device 200. For example, the terminal device 200 may be a router. For ease of description, the five terminal devices 100 may be respectively referred to as terminal devices A-E. The terminal device A and the terminal device B may perform Wi-Fi peer-to-peer communication, and the terminal device D and the terminal device E may perform Wi-Fi peer-to-peer communication. Optionally, the terminal devices A-E may further perform Wi-Fi communication with the terminal device 200. During communication, the terminal devices A-E may work in a wireless station (station, STA) mode. For example, FIG. 2 is another schematic diagram of an application scenario applicable to an embodiment of this application. As shown in FIG. 2, the application scenario may be a conference scenario, and there are 16 terminal devices 100 in a conference room. For ease of description, each pair of terminal devices that perform Wi-Fi peer-to-peer communication may be respectively referred to as a terminal device A and a terminal device B. To distinguish between different terminal devices A and B, the 16 terminal devices 100 may be respectively referred to as terminal devices A1-A8 and terminal devices B1-B8.

It should be noted that the application scenario is not limited in this embodiment of this application. Optionally, the application scenario may be a closed environment, for example, the conference scenario shown in FIG. 2 or a smart home scenario.

It should be noted that, in this embodiment of this application, a name, a type, a quantity of terminal devices in the application scenario and a quantity of terminal devices that perform Wi-Fi peer-to-peer communication are not limited. For example, the terminal device may also be referred to as user equipment (user equipment, UE), a mobile station (mobile station, MS), a terminal or a mobile terminal (mobile terminal, MT), and may be a device that provides voice/data connectivity to a user, for example, a handheld device or a vehicle-mounted device that has a wireless connection function. Currently, some examples of the terminal device are: a mobile phone (mobile phone), a tablet computer, a laptop computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

It should be noted that, in this embodiment of this application, a Wi-Fi P2P service implemented by the terminal device through Wi-Fi peer-to-peer communication is not limited. For example, the terminal device is configured to perform wireless projection presentation, or a file is shared between two mobile phones. With reference to FIG. 2, an example is used for description. It is assumed that the terminal devices A1-A8 are mobile phones, the terminal devices B1-B8 are projection devices, the terminal devices A1-A8 may implement a wireless projection service, and each mobile phone may project content displayed on a screen of the mobile phone on a corresponding projection device to display.

Figure 3A:
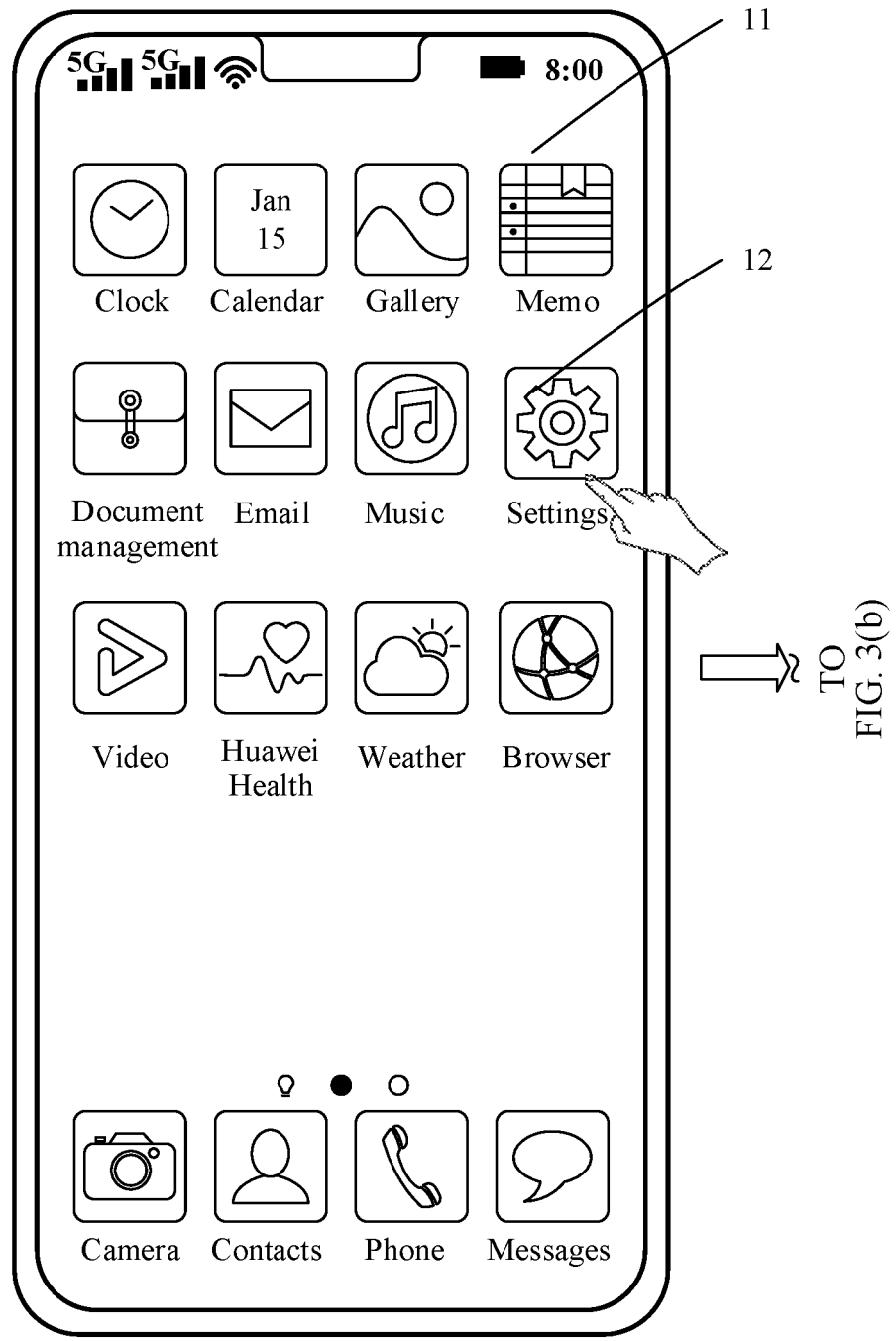
FIG. 3(a) to FIG. 3(f) are a schematic diagram of an interface of a terminal device performing a projection service according to an embodiment of this application.
Figure 3B:
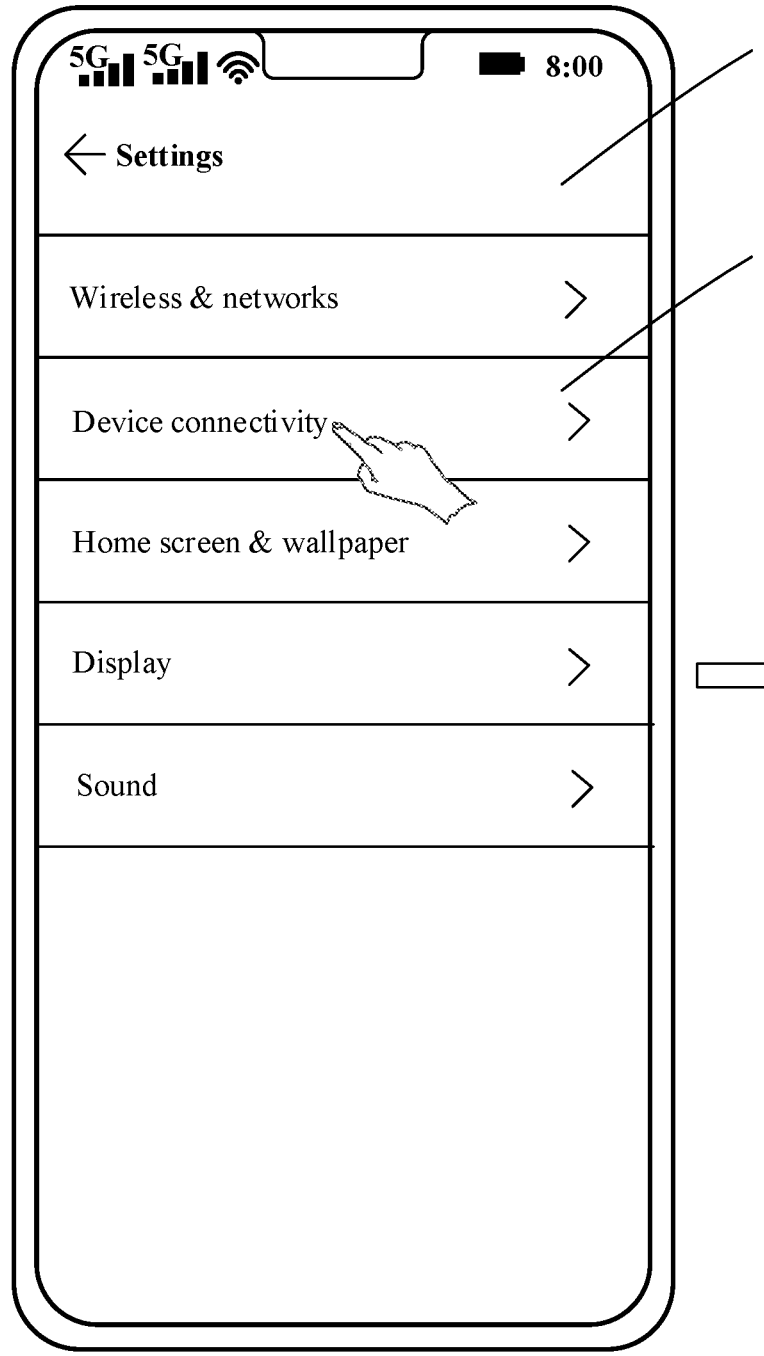
Figure 3C:
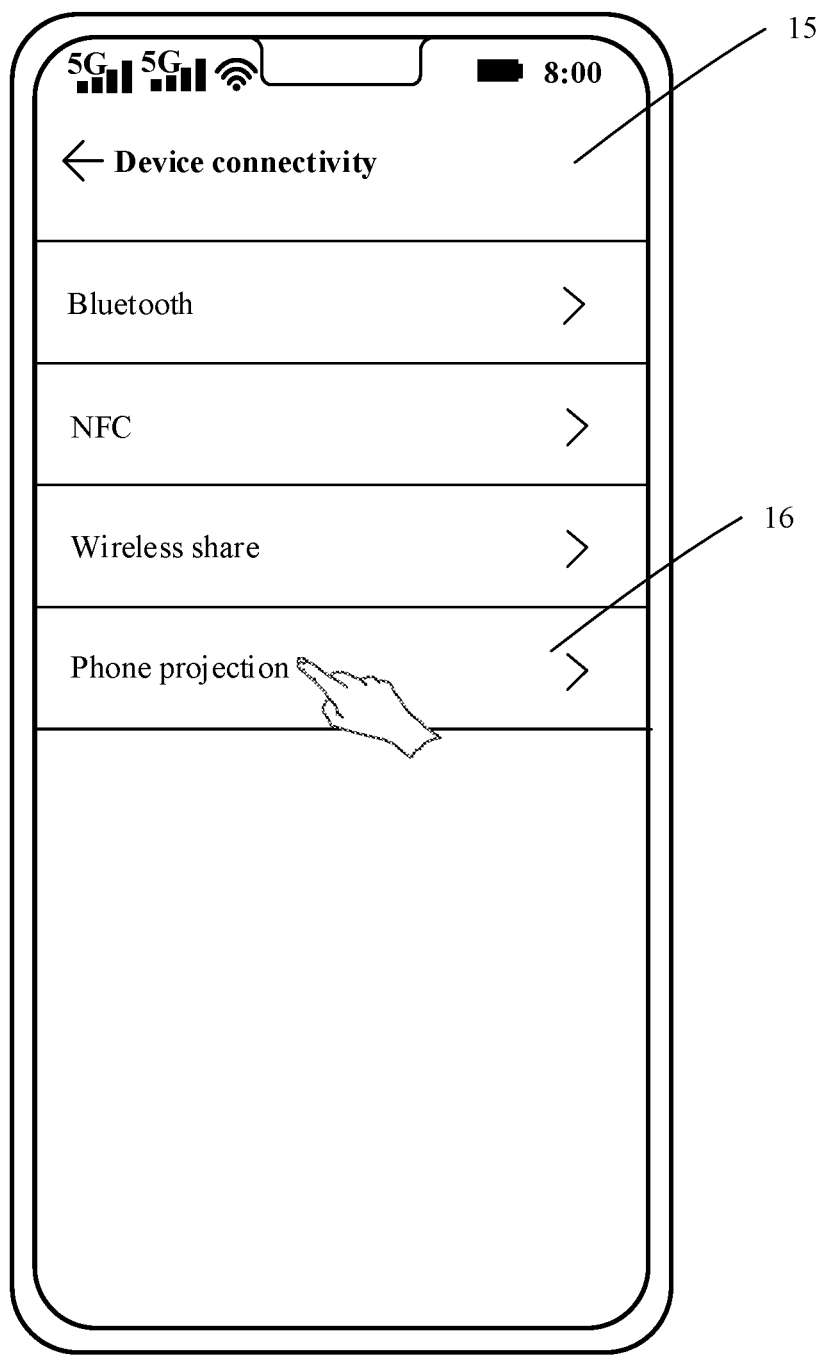
Figure 3D:
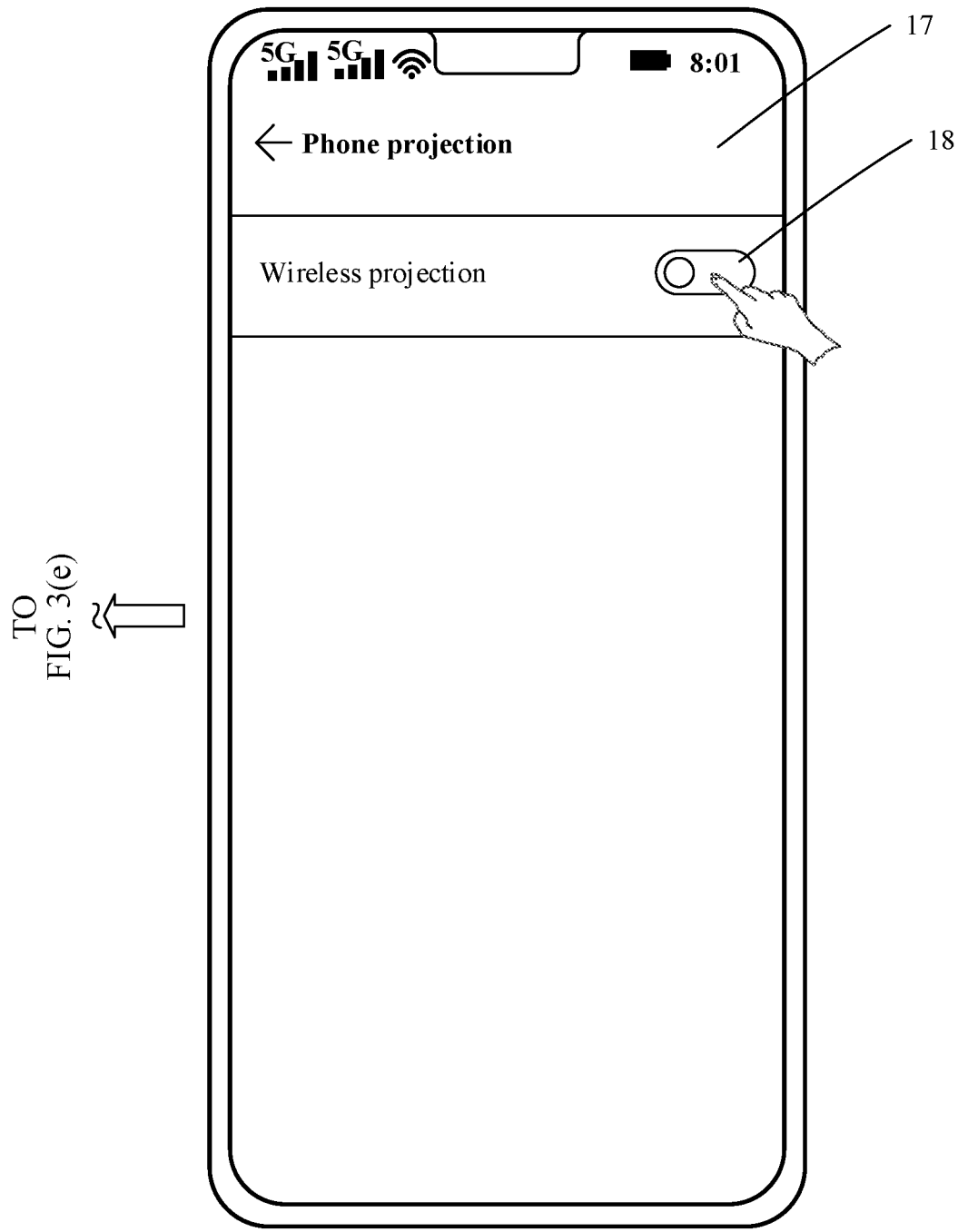
Figure 3E:
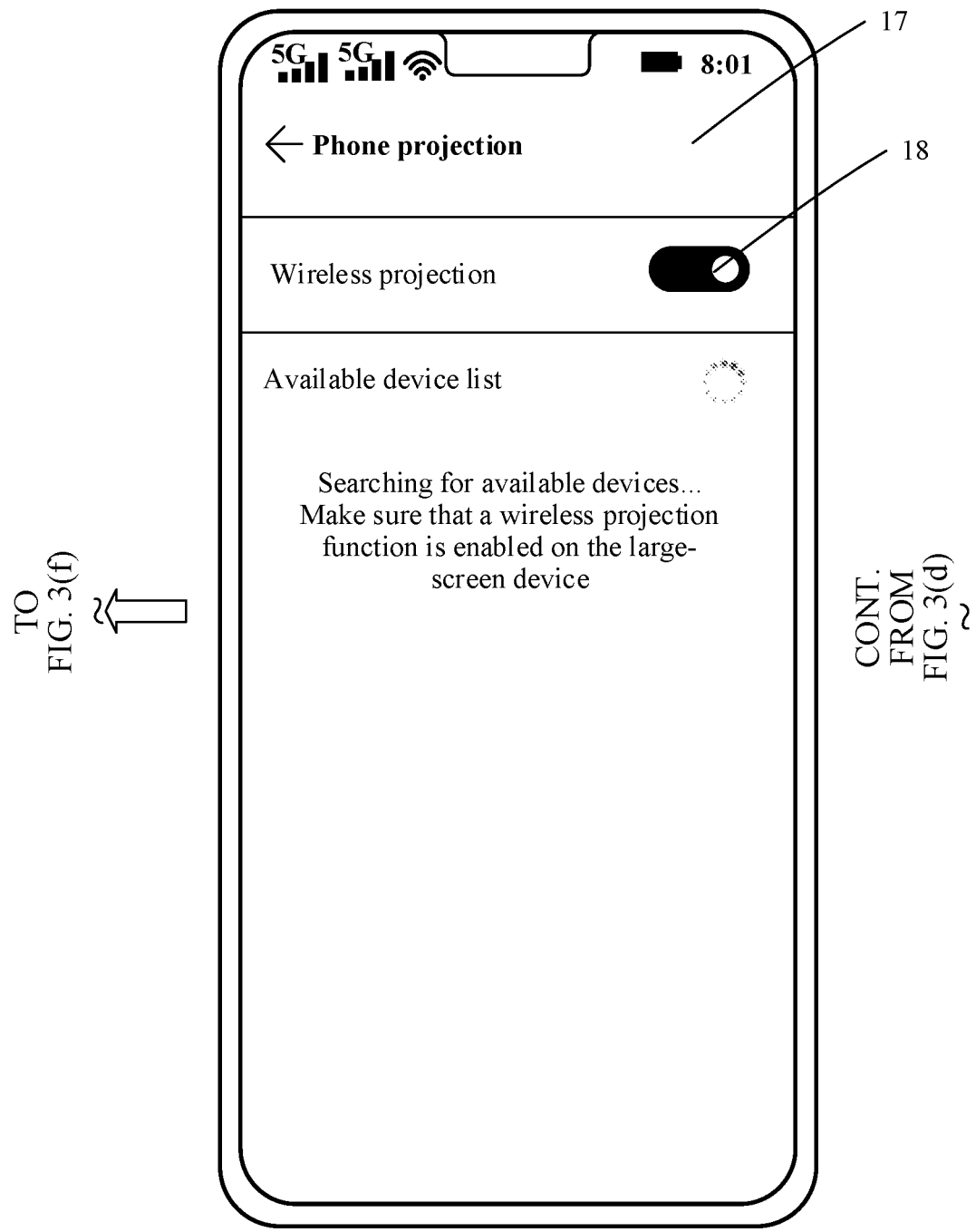
Figure 3F:
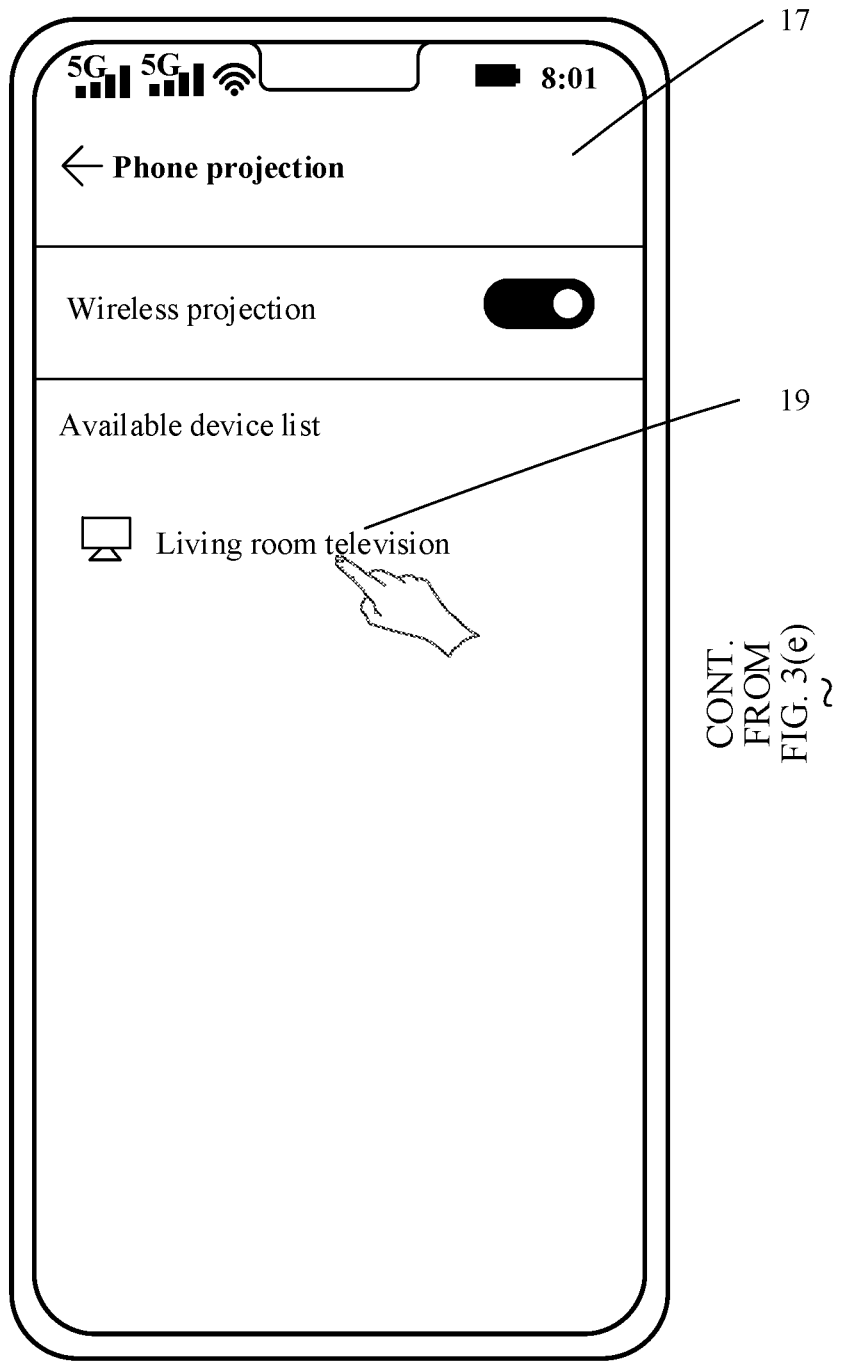

With reference to FIG. 3(a) to FIG. 3(f), the following provides an example description of a procedure in which a mobile phone performs a wireless projection service. As shown in FIG. 3(a), a desktop 11 of the mobile phone may include icons of a plurality of application programs. A user can tap an icon 12 of an application program "Settings" to enable the settings application. Correspondingly, the mobile phone responds to an operation of the user tapping the icon 12 of the settings application to display a main interface 13 of the settings application, as shown in FIG. 3(b). The main interface 13 of the settings application may include a plurality of function tabs, for example, a "Wireless & networks" tab, a "Device connectivity" tab. The user can tap a "Device connectivity" tab 14 to enable a device connection application. Correspondingly, the mobile phone responds to an operation of the user tapping the "Device connectivity" tab 14, and displays a main interface 15 of the device connection application, as shown in FIG. 3(c). The main interface 15 of the device connection may include a plurality of function tabs, for example, a "Bluetooth" tab, a "near field communication (near field communication, NFC)" tab. The user can tap a "Phone projection" tab 16 to enable a phone projection application. Correspondingly, the mobile phone responds to an operation of the user tapping the "Phone projection" tab 16, and displays a main interface 17 of the phone projection application, as shown in FIG. 3(d). The main interface 17 of the phone projection application may include a switch control 18 of a wireless projection function. Optionally, the wireless projection function is disabled by default. The user may tap the switch control 18 to enable a wireless projection application. Correspondingly, the mobile phone responds to an operation of the user tapping the switch control 18, and enables the wireless projection application to search for a device that can perform the wireless projection service around the mobile phone. In this process, the mobile phone may display prompt information to the user, as shown in FIG. 3(e). Then, as shown in FIG. 3(f), the mobile phone may display an available device list on the main interface 17 of the phone projection application. The user can tap a "Living room television" tab 19 to initiate a device connection. Correspondingly, the mobile phone responds to an operation of the user tapping the "Living room television" tab 19, and establishes a Wi-Fi peer-to-peer communication link to the living room television. Subsequently, the mobile phone and the living room television may perform data transmission of the wireless projection service based on the Wi-Fi peer-to-peer communication link, so as to implement the wireless projection service.

It should be noted that in this embodiment of this application, a communication protocol standard and version that are used for Wi-Fi peer-to-peer communication are not limited. For example, the communication protocol may include but is not limited to a Wi-Fi 5 standard or a Wi-Fi 6 standard.

It should be noted that this embodiment of this application sets no limitation on an implementation in which two terminal devices perform Wi-Fi peer-to-peer communication. Optionally, in an implementation, the two terminal devices may work in a Wi-Fi peer-to-peer (peer-to-peer, P2P) mode. Optionally, in another implementation, one terminal device may work in an access point (access point, AP) mode, and the other terminal device may work in a STA mode. For example, in FIG. 1, the terminal device A may work in the AP mode, and the terminal device B may work in the STA mode and associate with the terminal device A. It should be noted that a name of a communication link established between two terminal devices that perform Wi-Fi peer-to-peer communication is not limited in this embodiment of this application, for example, may be referred to as a D2D link, a D2D communication link, a P2P link, a P2P communication link, a P2P connection, or a Wi-Fi peer-to-peer communication link.

The following briefly describes several working modes of Wi-Fi.

1. AP Mode and STA Mode

In wireless local area networks (wireless local area networks, WLAN), an AP may work in an AP mode as a primary device, and another device connected to the WLAN network may be referred to as a STA. The AP manages and controls the STA to form a wireless network. The AP mode may also be referred to as a master mode (master mode), and the STA mode may also be referred to as a slave mode. For example, with reference to FIG. 1, when the terminal devices A-E perform Wi-Fi communication with the terminal device 200, the terminal device 200 works in an AP mode, and the terminal devices A-E work in a STA mode.

2. Wi-Fi P2P Mode

Wi-Fi P2P is also referred to as Wi-Fi Direct, and may implement direct communication between two devices without an AP. For example, with reference to FIG. 2, the terminal devices A1-A8 and the terminal devices B1-B8 are in peer-to-peer communication respectively in a one-to-one correspondence, and all the terminal devices A1-A8 and the terminal devices B1-B8 may work in the Wi-Fi P2P mode.

In the Wi-Fi P2P mode, there are two roles, respectively referred to as a group owner (group owner, GO) and a client (client). After initiating a P2P connection, two terminal devices perform P2P GO/Client negotiation. After P2P GO/Client negotiation is completed, one terminal device serves as a GO, and the other terminal device serves as a client. Determining of the GO or the client is not related to an initiator or a receiver of a P2P connection in the two terminal devices. For example, a terminal device 1 actively initiates a P2P connection to a terminal device 2, the terminal device 1 is an initiator of the P2P connection, and the terminal device 2 is a receiver of the P2P connection. In an implementation, the terminal device 1 may be a GO, and the terminal device 2 may be a client. In another implementation, the terminal device 1 may be a client, and the terminal device 2 may be a GO.

Figure 4:
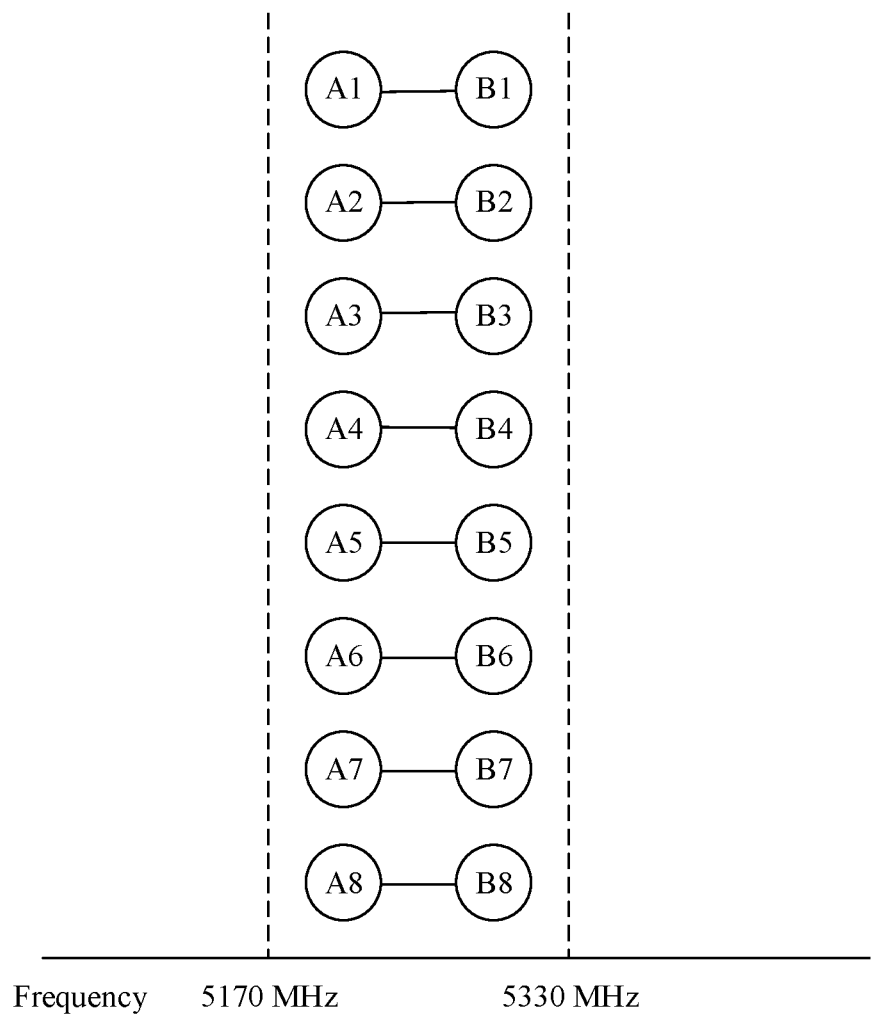
FIG. 4 is a schematic diagram of occupying a channel by each terminal device in FIG. 2.

In an application scenario in which a plurality of pairs of terminal devices simultaneously perform Wi-Fi peer-to-peer communication, in an implementation, each pair of terminal devices may establish a D2D link on a Wi-Fi channel with a maximum bandwidth supported. For example, the maximum bandwidth may be 80 MHz or 160 MHz, a channel may include but is not limited to: 5170-5330 MHz and 5490-5650 MHz, and a bandwidth of the channel is 160 MHz. In this scenario, there are a plurality of D2D links on a same channel. For example, with reference to FIG. 2 and FIG. 4, it is assumed that the maximum bandwidth is 160 MHz, and each pair of terminal devices A and B establish a 160 MHz D2D link on a 5170-5330 MHz channel. In this case, there are eight D2D links on the channel at the same time. It should be noted that FIG. 4 is only an example, and does not limit establishment of a D2D link on a channel by a terminal device. For example, in another implementation, terminal devices A1-A3 and terminal devices B1-B3 establish a 160 MHz D2D link on a 5170-5330 MHz channel, and there are three D2D links on the channel at the same time. In addition, terminal devices A4-A8 and terminal devices B4-B8 establish a 160 MHz D2D link on a 5490-5650 MHz channel, and there are five D2D links on the channel at the same time.

When there are a plurality of D2D links on a same channel, contention for a transmission resource is involved. Currently, a CSMA/CA mechanism is used for Wi-Fi communication. In the CSMA/CA mechanism, a transmit end device first detects whether the channel is idle. If the transmit end device determines that the channel is not idle, the transmit end device continues to wait. If the transmit end device determines that the channel is idle, the transmit end device sends data after waiting for a random period of time. After receiving the data sent by the transmit end device, if it is determined that the data is correct, a receive end device sends an acknowledge character (acknowledge character, ACK) frame to the transmit end device after waiting for a time interval. A random time for waiting by the transmit end device and a time interval for waiting by the receive end device are not limited. For example, the CSMA/CA mechanism includes but is not limited to the following interframe space (interframe space, IFS): short interframe space (short interframe space, SIFS), long interframe space (long interframe space, LIFS), point coordination function interframe space (PCF interframe space, PIFS), distributed coordination function interframe space (DCF interframe space, DIFS), or extended interframe space (extended interframe space, EIFS).

Figure 5:
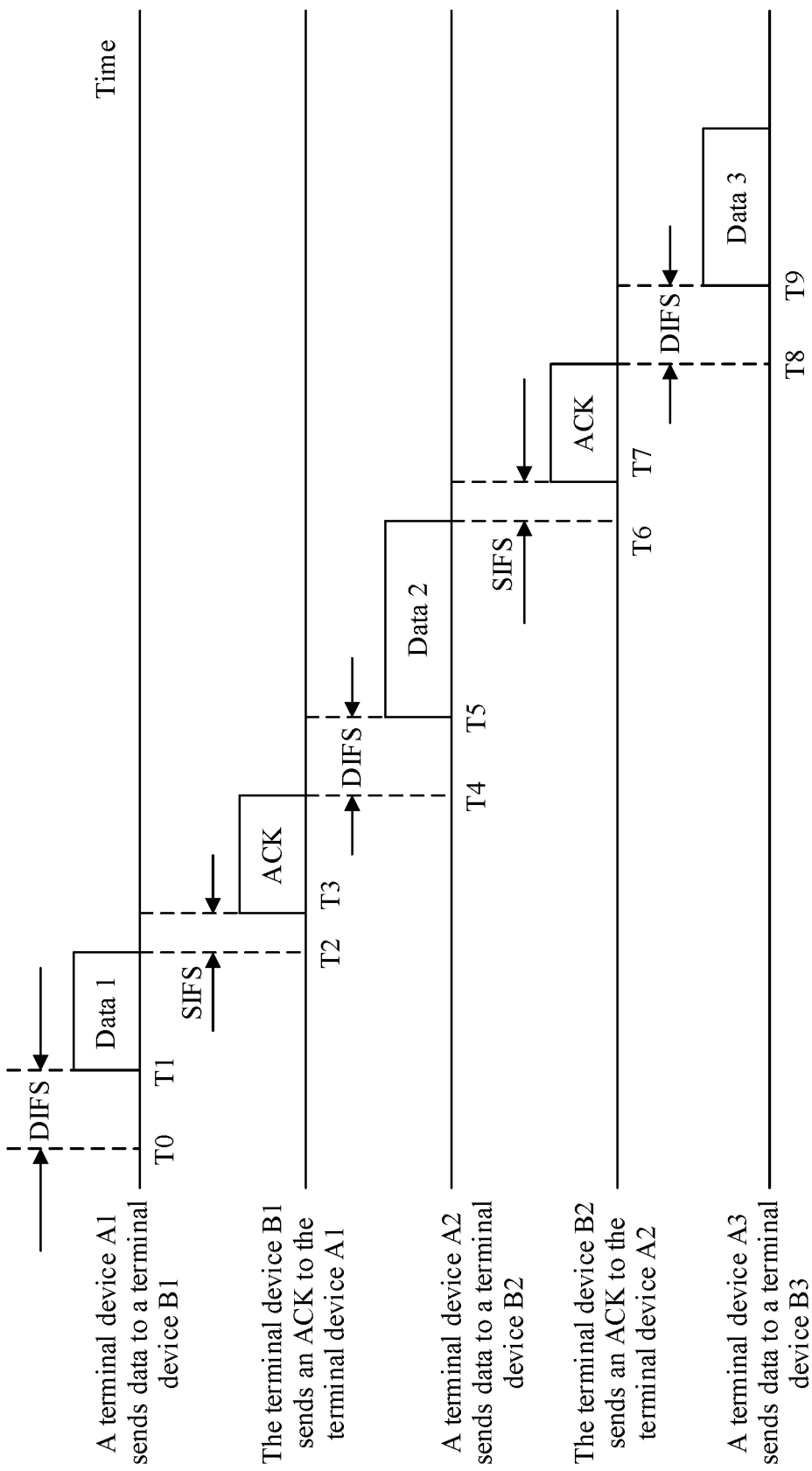
FIG. 5 is a schematic diagram of a principle of a CSMA/CA avoidance mechanism.

The following provides an example description of the CSMA/CA mechanism with reference to FIG. 4 and FIG. 5. For example, the random time for waiting by the transmit end device may be the DIFS, and the time interval for waiting by the receive end device may be the SIFS. A channel is 5170-5330 MHz, and a bandwidth is 160 MHz. As shown in FIG. 5, a terminal device A1 needs to send data to a terminal device B1. After detecting that a channel is idle at a moment T0 and waiting for a DIFS, the terminal device A1 sends data 1 to the terminal device B1 at a moment T1. Correspondingly, after receiving the data 1, if it is determined that the data 1 is correct, the terminal device B1 waits for SIFS duration from a moment T2, and sends an ACK to the terminal device A1 at a moment T3. The channel is not idle between T1-T2, and is not idle between T3-T4. Another terminal device cannot send data in this time period, and can only keep waiting. After a moment T4, the channel is idle, and a terminal device A2 may send data to a terminal device B2. For details, refer to related description in which the terminal device A1 sends the data 1. Principles are similar, and details are not described herein again. Similarly, the channel is not idle between T5-T6, and is not idle between T7-T8. Another terminal device cannot send data in this time period, and can only keep waiting. After a moment T8, the channel is idle, and a terminal device A3 may send data to a terminal device B3.

It can be learned that in a scenario in which a plurality of pairs of terminal devices simultaneously perform Wi-Fi peer-to-peer communication, a plurality of D2D links work on a same high bandwidth channel at the same time, frequent transmission resource contention and collision may occur when the CSMA/CA mechanism is used, and even a case in which the terminal device always cannot obtain an air interface sending opportunity may occur, thereby increasing a transmission delay of a Wi-Fi P2P service and increasing channel interference.

An embodiment of this application provides a communication method, and a high bandwidth channel may be divided into a plurality of narrow bandwidth channels for use. A terminal device selects a relatively idle narrowband channel to transmit Wi-Fi P2P service data, thereby reducing a probability of contending for a transmission resource with another terminal device on a same channel, and reducing channel interference. In a scenario in which a plurality of pairs of terminal devices simultaneously perform Wi-Fi peer-to-peer communication, concurrent communication of the plurality of pairs of terminal devices can be implemented, which reduces a transmission delay of performing a Wi-Fi P2P service by each pair of terminal devices, and increases a throughput of an entire system.

Figure 6:
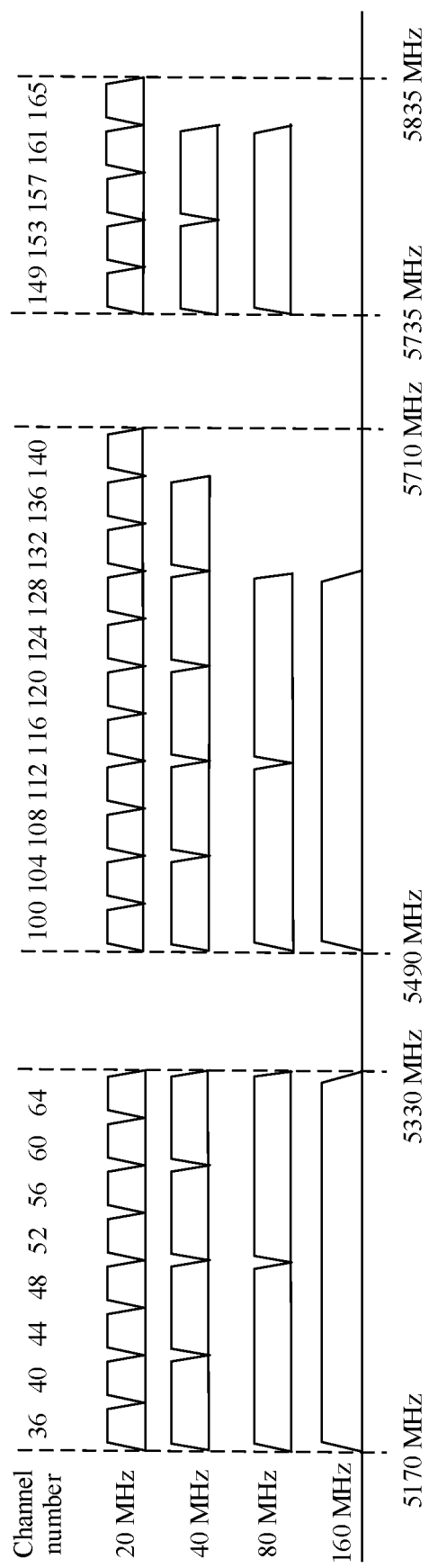
FIG. 6 is a schematic diagram of channel division applicable to an embodiment of this application.

It should be noted that a division manner of a narrowband channel and a bandwidth of the narrowband channel are not limited in this embodiment of this application. For example, the bandwidth of the narrowband channel may include but is not limited to 80 MHz, 40 MHz, or 20 MHz. For example, FIG. 6 is a schematic diagram of channel division applicable to an embodiment of this application. As shown in FIG. 6, within a range of 5170-5330 MHz, one 160 MHz channel, two 80 MHz channels, four 40 MHz channels, or eight 20 MHz channels may be obtained through division. Within a range of 5490-5710 MHz, one 160 MHz channel, two 80 MHz channels, five 40 MHz channels, or eleven 20 MHz channels may be obtained through division. Within a range of 5735-5835 MHz, one 80 MHz channel, two 40 MHz channels, or five 20 MHz channels may be obtained through division. Optionally, each channel may have a channel number, and the channel number may uniquely distinguish between different channels. For example, for eight 20 MHz channels in a range of 5170-5330 MHz, channel numbers may be 36, 40, 44, 48, 52, 56, 60, and 64, respectively. For ease of description, in this embodiment of this application, a channel is represented in a manner of "a channel number of a 20 MHz channel corresponding to a channel starting frequency+a bandwidth". For example, a 20 MHz channel corresponding to 5210-5230 MHz may be represented as 44/20 MHz, and a 40 MHz channel corresponding to 5210-5250 MHz may be represented as 44/40 MHz. An 80 MHz channel corresponding to 5735-5815 MHz may be represented as 149/80 MHz, a 40 MHz channel corresponding to 5735-5775 MHz may be represented as 149/40 MHz, and a 20 MHz channel corresponding to 5735-5755 MHz may be represented as 149/20 MHz.

Figure 7:
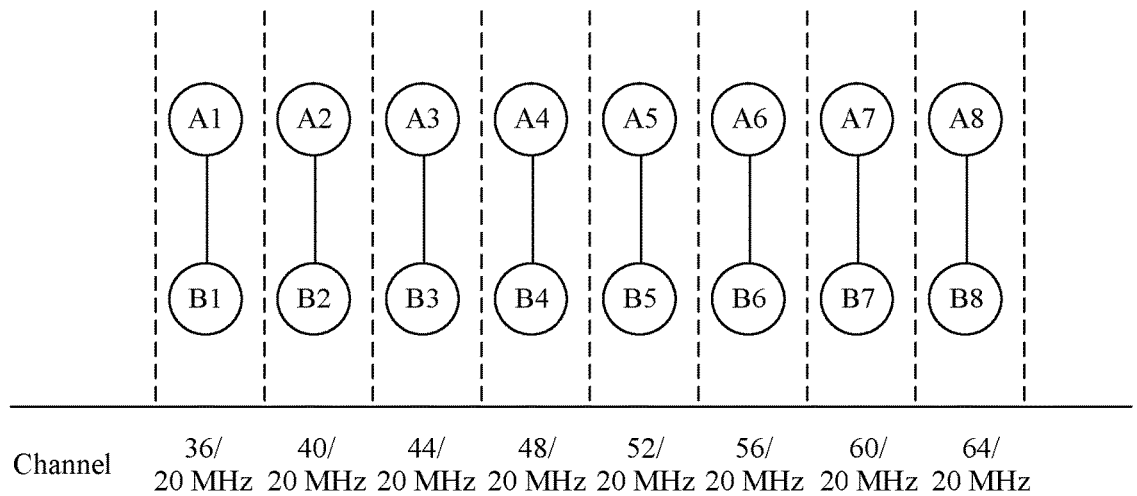
FIG. 7 is a schematic diagram of using a channel by each terminal device in FIG. 2 according to an embodiment of this application.
Figure 8:
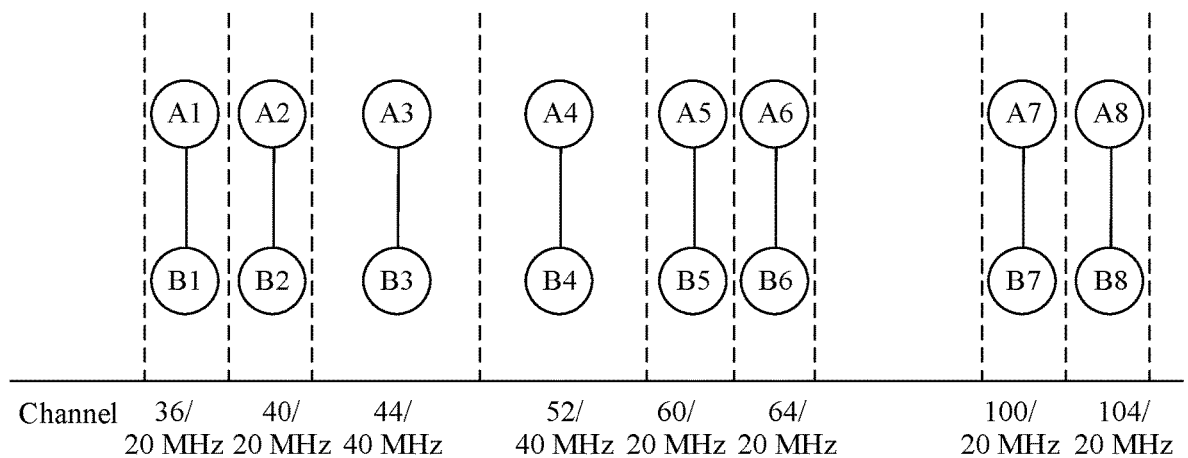
FIG. 8 is another schematic diagram of using a channel by each terminal device in FIG. 2 according to an embodiment of this application.

The following uses a scenario shown in FIG. 2 as an example to describe a channel occupied by each terminal device after the terminal device uses the communication method provided in this embodiment of this application. Optionally, in an example, with reference to FIG. 7, when the terminal devices A1-A8 perform Wi-Fi peer-to-peer communication in a one-to-one correspondence with the terminal devices B1-B8, each pair of terminal devices A and B may each occupy a 20 MHz channel in a range of 5170 MHz-5330 MHz. A channel 36/20 MHz is used as an example, there is only one 20 MHz D2D link on the channel, the terminal devices A1 and B1 do not involve contending for a transmission resource with another terminal device, and channel interference is light. Optionally, in another example, with reference to FIG. 8, the terminal devices A3 and B3 and terminal devices A4 and B4 may occupy a 40 MHz channel, and remaining terminal devices each occupy a 20 MHz channel. Compared with FIG. 4, the communication method provided in this embodiment of this application implements concurrent communication of a plurality of pairs of terminal devices that perform Wi-Fi peer-to-peer communication, which reduces a transmission delay of performing a Wi-Fi P2P service by each pair of terminal devices, and increases a system throughput.

Specific embodiments are used below to describe in detail the technical solutions of this application. The following several specific embodiments may be combined with each other, and a same or similar concept or process may not be described repeatedly in some embodiments.

Figure 9:
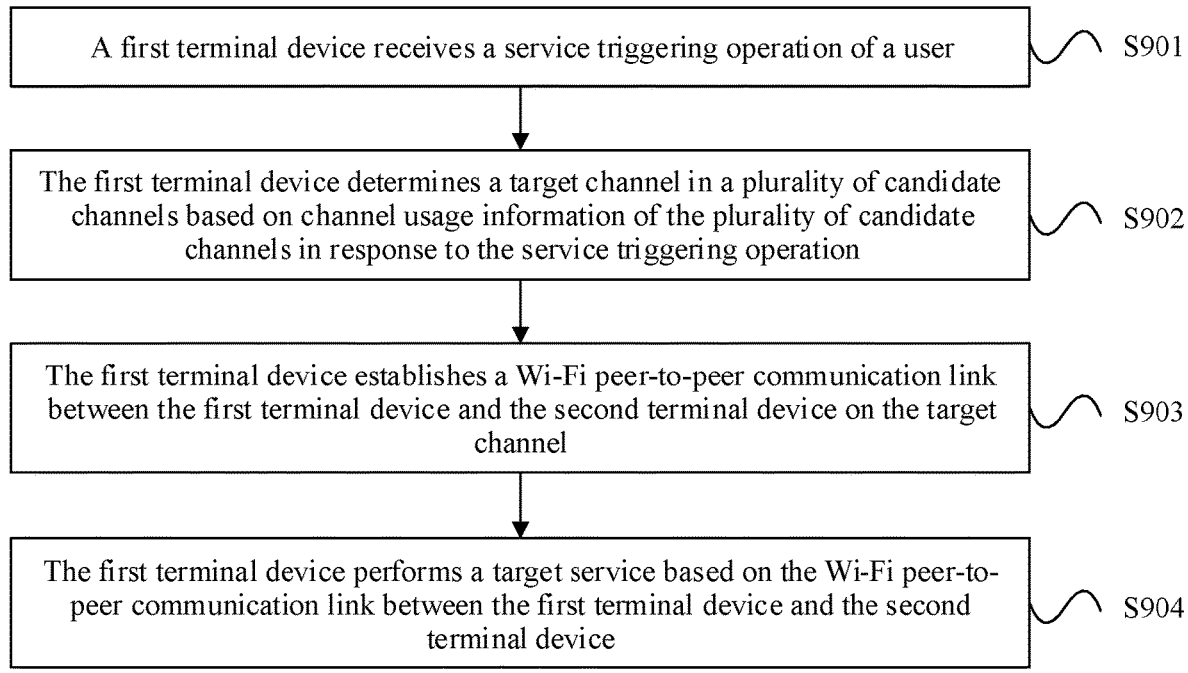
FIG. 9 is a flowchart of a communication method according to an embodiment of this application.

FIG. 9 is a flowchart of a communication method according to an embodiment of this application. The communication method provided in this embodiment may be applied to a phase in which a terminal device initially establishes a Wi-Fi peer-to-peer communication link. For ease of description, in the communication method provided in this embodiment, an execution body may be referred to as a first terminal device, and a terminal device that performs Wi-Fi peer-to-peer communication with the first terminal device may be referred to as a second terminal device. As shown in FIG. 9, the communication method provided in this embodiment may include the following steps:

S901: The first terminal device receives a service triggering operation of a user.

The service triggering operation of the user is used to trigger the first terminal device to perform a target service, and the target service is implemented based on Wi-Fi peer-to-peer communication performed by the first terminal device and the second terminal device. A specific implementation of the service triggering operation and a type of the target service are not limited in this embodiment. Optionally, the service triggering operation of the user may include but is not limited to at least one of the following: a tap operation, a double-tap operation, or a slide operation that is performed by the user on a touch display of the first terminal device, or a voice input operation of the user. For example, refer to a related operation of the user in FIG. 3(a) to FIG. 3(f). Optionally, the target service may include but is not limited to a wireless projection service or a file sharing service.

S902: The first terminal device determines a target channel in a plurality of candidate channels based on channel usage information of the plurality of candidate channels in response to the service triggering operation.

The plurality of candidate channels may have a plurality of bandwidths, there is at least one candidate channel of each bandwidth, and the channel usage information may be used to indicate an idle degree of a candidate channel.

A quantity of candidate channels and a bandwidth of a candidate channel are not limited in this embodiment. With reference to FIG. 6, an example is used for description. Optionally, in an example, a plurality of candidate channels may have four types of bandwidths, which are respectively 160 MHz, 80 MHz, 40 MHz, and 20 MHz. There may be 15 candidate channels, including one 160 MHz channel, two 80 MHz channels, four 40 MHz channels, and eight 20 MHz channels in a range of 5170-5330 MHz. Optionally, in another example, a plurality of candidate channels may have three types of bandwidths, which are respectively 160 MHz, 40 MHz, and 20 MHz. There may be 50 candidate channels, including two 160 MHz channels, nine 40 MHz channels, and nineteen 20 MHz channels in ranges of 5170-5330 MHz and 5490-5170 MHz.

Because there are a plurality of candidate channels that have a plurality of bandwidths, the first terminal device may select a relatively idle target channel from the plurality of candidate channels based on channel usage information of each candidate channel. The target channel may be a channel with a relatively high bandwidth, for example, a 160 MHz channel, or may be a narrowband channel with a relatively narrow bandwidth, for example, a channel of 20 MHz or 40 MHz. In a scenario in which a plurality of pairs of terminal devices simultaneously perform Wi-Fi peer-to-peer communication, the first terminal device selects a relatively idle target channel, which avoids that a plurality of pairs of terminal devices occupies a same channel, reduces a probability that terminal devices on a same channel contend for a transmission resource, and reduces channel interference.

S903: The first terminal device establishes a Wi-Fi peer-to-peer communication link between the first terminal device and the second terminal device on the target channel.

S904: The first terminal device performs a target service based on the Wi-Fi peer-to-peer communication link between the first terminal device and the second terminal device.

An existing procedure of establishing a D2D link between terminal devices that perform Wi-Fi peer-to-peer communication may be used. This is not limited in this embodiment. For example, the first terminal device and the second terminal device may work in a Wi-Fi P2P mode.

It can be learned that in the communication method provided in this embodiment, to perform the target service in response to the service triggering operation of the user, the first terminal device first needs to establish a Wi-Fi peer-to-peer communication link to the second terminal device. The first terminal device may select the target channel from the plurality of candidate channels to establish the link. The plurality of candidate channels include a plurality of channels with a plurality of bandwidths. The first terminal device may select a relatively idle target channel based on the channel usage information of each candidate channel, and perform the target service based on the Wi-Fi peer-to-peer communication link established on the target channel. The communication method provided in this embodiment may be applied to a scenario in which a plurality of pairs of terminal devices simultaneously perform Wi-Fi peer-to-peer communication. Compared with a scenario in which a plurality of pairs of terminal devices simultaneously occupy one high bandwidth channel, a high bandwidth channel may be divided into a plurality of narrow bandwidth channels for use. Based on idle degrees of channels of various bandwidths, the terminal device selects a relatively idle channel to transmit service data, thereby reducing a probability of contending for a transmission resource with another terminal device on a same channel, reducing channel interference, implementing concurrent communication of a plurality of pairs of terminal devices, reducing a transmission delay of performing a service by each pair of terminal devices, and increasing a throughput of an entire system.

Optionally, the communication method provided in this embodiment may further include the following steps:

The first terminal device obtains service information of the target service.

Correspondingly, in S902, that the first terminal device determines the target channel in the plurality of candidate channels based on the channel usage information of the plurality of candidate channels may include the following steps:

The first terminal device determines the target channel in the plurality of candidate channels based on the service information and the channel usage information.

Specifically, the service information of the target service may be used to determine a bandwidth of a channel required by the target service. The first terminal device determines the target channel based on the service information and the channel usage information of the plurality of candidate channels, and may select a relatively idle target channel on a premise that a target service throughput requirement is met, thereby reducing a probability that terminal devices on a same channel contend for a transmission resource, reducing channel interference, reducing a transmission delay of performing a service by each pair of terminal devices, and increasing a system throughput.

Optionally, the service information may include but is not limited to at least one of the following: a service name, a service type, a data packet type, a data packet size, a data transmission rate, a Wi-Fi standard, a quantity of antenna streams, a preset channel bandwidth corresponding to a service, a minimum channel bandwidth corresponding to a service or a maximum quantity of established Wi-Fi peer-to-peer communication links on a channel. This is not limited in this embodiment. For example, different service types may correspond to different channels with different bandwidths. For example, a wireless projection service generally has a relatively high delay requirement. A minimum channel bandwidth corresponding to the wireless projection service may be 20 MHz, and a corresponding preset channel bandwidth may be 40 MHz or 80 MHz. For example, both a minimum channel bandwidth and a preset channel bandwidth corresponding to the file sharing service may be 20 MHz. Optionally, the Wi-Fi standard may include but is not limited to Wi-Fi 5 or Wi-Fi 6.

Optionally, the channel usage information may include but is not limited to at least one of the following: channel quality information, a quantity of terminal devices on a channel that perform a Wi-Fi P2P service, a quantity of pairs of terminal devices on a channel that perform a Wi-Fi P2P service, or a quantity of established Wi-Fi peer-to-peer communication links on a channel. Optionally, the channel quality information may include but is not limited to at least one of the following: background noise, a signal-to-noise ratio, signal spectrum information, channel estimated throughput, or a channel busy ratio.

For example, with reference to FIG. 4, there are 16 terminal devices that perform a Wi-Fi P2P service on a channel, there are eight pairs of terminal devices that perform a Wi-Fi P2P service on a channel, and there are eight established Wi-Fi peer-to-peer communication links on a channel. If a quantity of terminal devices that perform a Wi-Fi P2P service on a channel, a quantity of pairs of terminal devices that perform a Wi-Fi P2P service on a channel, or a quantity of established Wi-Fi peer-to-peer communication links on a channel is larger, it indicates that the channel is busier; on the contrary, if a quantity is smaller, it indicates that the channel is more idle. In a signal spectrum, a higher amplitude of a frequency component of a signal indicates that a channel on which the frequency is located is busier. On the contrary, a lower amplitude of the frequency component of the signal indicates that the channel on which the frequency is located is more idle. A higher channel estimated throughput indicates that the channel is more idle. On the contrary, a lower channel estimated throughput indicates that the channel is busier. The channel busy ratio may also be referred to as a channel load (Channel Load). A higher channel busy ratio indicates that the channel is busier. On the contrary, a lower channel busy ratio indicates that the channel is more idle.

Figure 10:
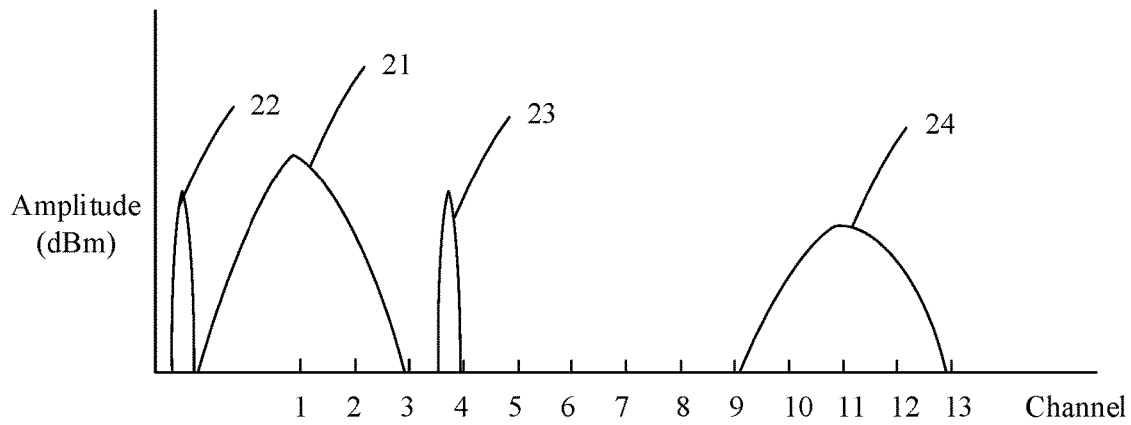
FIG. 10 is a schematic diagram of a signal spectrum according to an embodiment of this application.

It should be noted that different content of the channel usage information can be obtained in different manners and defined differently. For example, the channel estimated throughput may be determined based on a signal-to-noise ratio (signal noise ratio, SNR) of a channel. For example, the channel busy ratio may be defined as channel busy duration/total measurement time, expressed in percentage. For another example, in a Wi-Fi communication protocol, a channel busy ratio may be defined as Channel Load=Integer ((channel busy time/(Measurement Duration×1024))×255). Integer represents a rounding operation, channel busy time represents the channel busy duration, and Measurement Duration represents measurement duration. For definitions, refer to the protocol. Optionally, in an implementation, the first terminal device may obtain the signal spectrum information by using a power spectral density (power spectral density, PSD) scanning capability of a Wi-Fi chip, to obtain distribution of each frequency of a signal in frequency domain. For example, FIG. 10 is a schematic diagram of a signal spectrum according to an embodiment of this application. The signal spectrum can intuitively reflect whether there is interference on a channel and an idle degree of the channel. For example, in FIG. 10, a horizontal axis may represent a channel number, and a difference between two adjacent channel numbers is 5 MHz. A vertical axis may represent an amplitude of a frequency component of a signal. It can be learned that there is a 20 MHz Wi-Fi signal 21 on a channel 1, and there are two narrowband interference signals at each end of it, which are a signal 22 and a signal 23, for example, Bluetooth signals. There is also a 20 MHz Wi-Fi signal 24 on a channel 11. A channel 6 is an idle channel, and the channel 1 is busier than the channel 11. Optionally, in another implementation, the first terminal device may obtain channel usage information through Wi-Fi protocol scanning. Wi-Fi protocol scanning may be performed by sending a probe probe frame on a target scanning channel for active scanning or by monitoring a beacon beacon frame for passive scanning. In a scanning process, the Wi-Fi chip may measure information such as a signal-to-noise ratio, background noise, a channel busy ratio of each channel, or may further estimate the channel estimated throughput by using the signal-to-noise ratio.

Optionally, the communication method provided in this embodiment may further include the following steps:

The first terminal device receives first channel announcement information broadcast by a third terminal device, where the first channel announcement information is used to indicate a channel occupied by a Wi-Fi peer-to-peer communication link established by the third terminal device.

For ease of description, another terminal device that performs Wi-Fi peer-to-peer communication different from the first terminal device and the second terminal device in the application scenario may be referred to as the third terminal device. The first terminal device may learn of, by receiving the first channel announcement information broadcast by the third terminal device, a quantity of established Wi-Fi peer-to-peer communication links on the channel. The following provides example descriptions of the first channel announcement information with reference to FIG. 11. For example, an application scenario includes a first terminal device A4, and further includes terminal devices A1-A3 and B1-B3 that perform Wi-Fi peer-to-peer communication. The third terminal device may be any one of the terminal devices A1-A3 and B1-B3. Terminal devices A1 and B1 occupy a channel 36/20 MHz, terminal devices A2 and B2 occupy a channel 48/20 MHz, and terminal devices A3 and B3 occupy a channel 149/40 MHz. For example, the third terminal device is the terminal device A1, the third terminal device A1 may broadcast first channel announcement information on the channel 36/20 MHz, and the first channel announcement information indicates that a channel occupied by a Wi-Fi peer-to-peer communication link established by the third terminal device A1 is 36/20 MHz. In the application scenario, another terminal device different from the third terminal device A1 may receive the first channel announcement information. Correspondingly, the first terminal device A4 may receive the first channel announcement information broadcast by the third terminal device A1, and increase a quantity of established Wi-Fi peer-to-peer communication links on the channel 36/20 MHz by 1.

A name of the first channel announcement information, specific content included in the first channel announcement information, and a broadcast manner are not limited in this embodiment.

Figure 11:
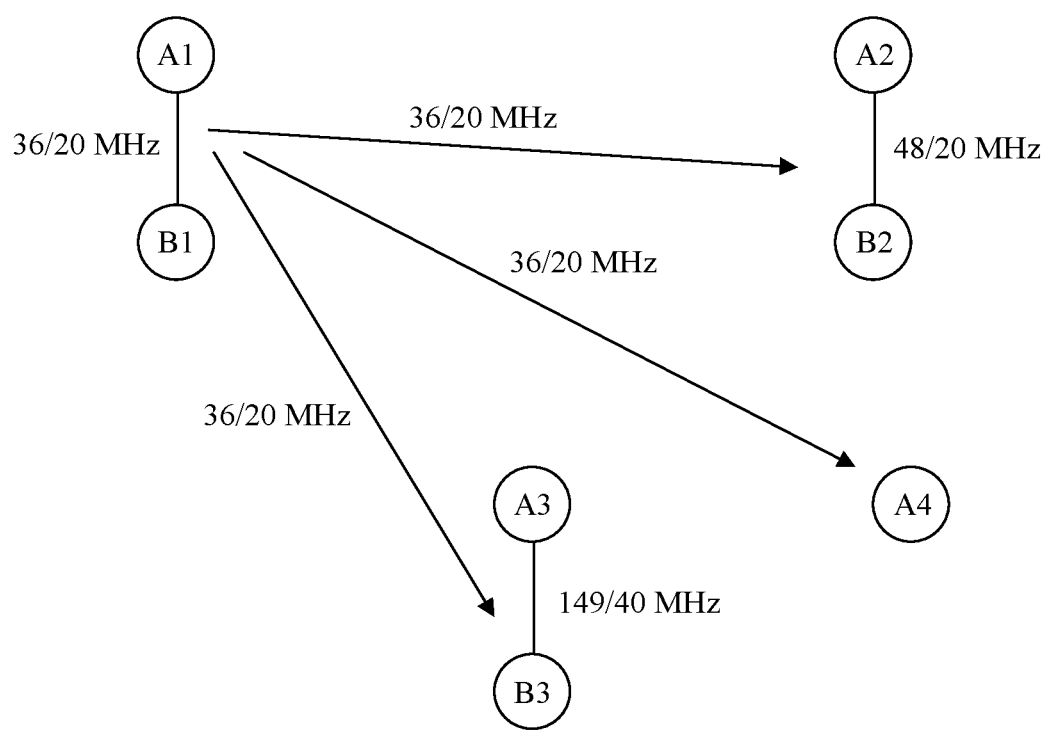
FIG. 11 is a schematic diagram of transmission channel announcement information according to an embodiment of this application.
Figure 12:
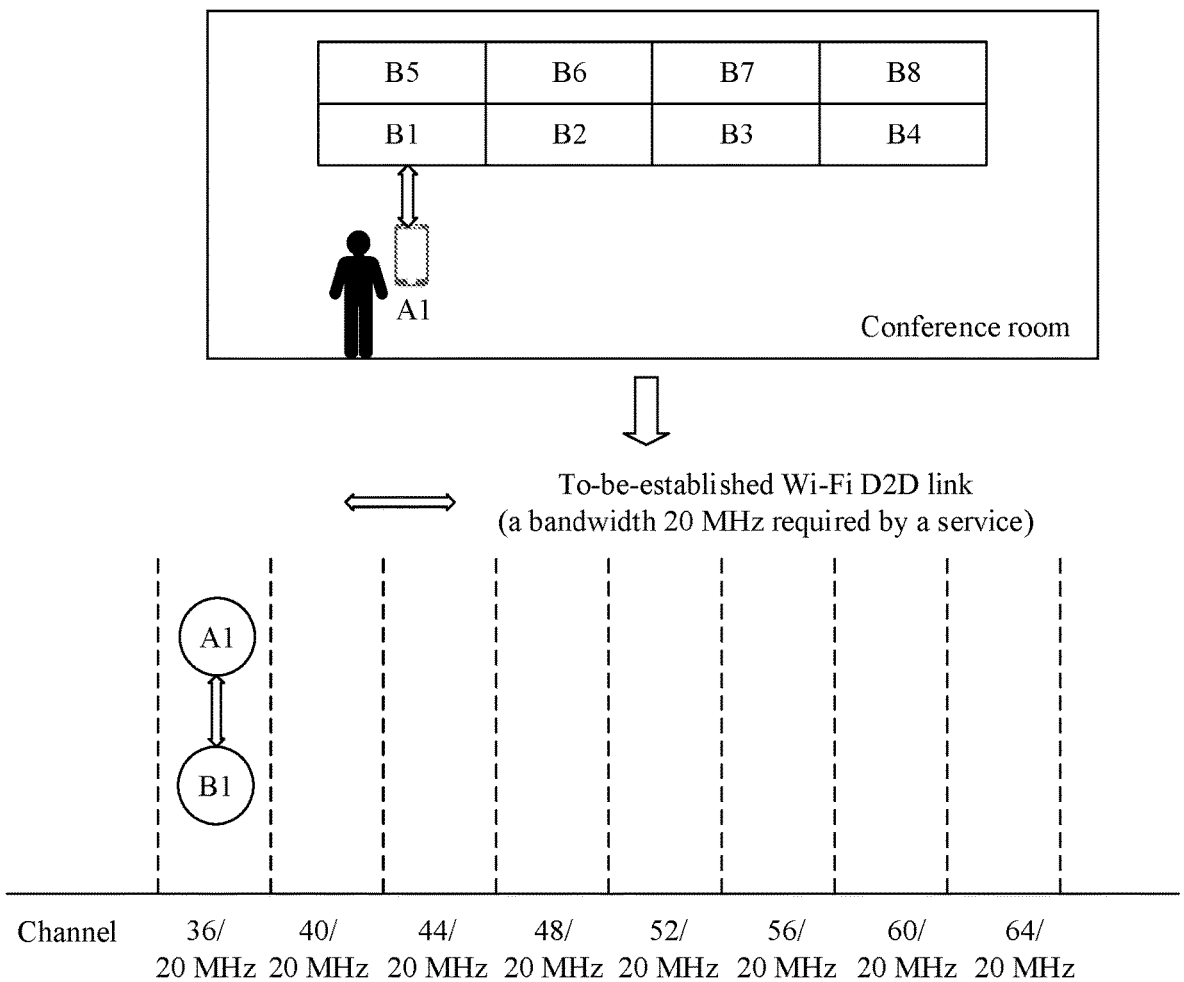
FIG. 12 is a schematic diagram of using a channel by a terminal device according to an embodiment of this application.

Optionally, in an implementation, the first channel announcement information may be carried in a beacon frame (beacon frame) broadcast by the third terminal device. For example, the first channel announcement information may be carried in a vendor IE (vendor information element) field in the beacon frame. For example, Table 1 shows a structure of the vendor IE in the beacon frame. As shown in Table 1, byte numbers may be 0-8. A value of a field Element ID is DD, which represents the vendor IE in the beacon frame. A value of a field Length corresponding to a byte 1 is 7, which represents 7 bytes whose byte numbers are 2-8. A field OUI is used to distinguish between different vendors. A value of a field Feature ID is 0x20, which represents that the vendor IE carries "channel announcement information", which may also be referred to as "D2D channel information notification". A field Tag represents a tag number, and a value of a field Length corresponding to a byte 7 is 1, which represents a byte whose byte number is 8. A field channel and bandwidth info is used to indicate a channel and a bandwidth that are used by a D2D link established by a terminal device. FIG. 11 is used as an example. For the first channel announcement information broadcast by the terminal device A1, a value of the field channel and bandwidth info may indicate to use the channel 36/20 MHz. For the first channel announcement information broadcast by the terminal device A3, a value of the field channel and bandwidth info may indicate to use the channel 149/40 MHz. This embodiment sets no limitation on an implementation about how the value of the field channel and bandwidth info represents the channel and the bandwidth that are used by the D2D link. It should be noted that the first channel announcement information and the vendor IE are not limited in Table 1.

TABLE 1

| Octal | 0 | 1 | 2 | 3 | 4 | 5 | 6 | 7 | 8 |
|---|---|---|---|---|---|---|---|---|---|
| Field Name | Element ID | Length | | OUI | | Feature ID | Tag | Length | channel and bandwidth info |
| Field Meaning | vendor IE number | IE length | | Vendor identifier | | D2D channel information notification | Tag (Tag) number | Tag (Tag) Length | Channel and bandwidth that are used by a D2D link |
| Example value | DD | 7 | | 0 | E0 FC | 0x20 | 0 | 1 | bits 0-7 |

Optionally, in another implementation, the first channel announcement information may be carried in a Bluetooth broadcast frame broadcast by the third terminal device. For example, Table 2 shows a structure of a Bluetooth low energy (Bluetooth low energy, BLE) broadcast frame. As shown in Table 2, the BLE broadcast frame may include the following fields: a header, an address, a length, and data. The data field may occupy 30 bytes, and is used to carry channel announcement information. For details, refer to descriptions of the field channel and bandwidth info in Table 1. Principles are similar, and details are not described herein again. It should be noted that the first channel announcement information and the Bluetooth broadcast frame are not limited in Table 2.

TABLE 2

| Header | Address | Length | Data (30 bytes) |
| --- | --- | --- | --- |
| (2 bytes) | (6 bytes) | (1 byte) | (Carrying channel announcement information) |

Optionally, the communication method provided in this embodiment may further include the following steps:

The first terminal device broadcasts second channel announcement information. The second channel announcement information is used to indicate a channel occupied by a Wi-Fi peer-to-peer communication link established by the first terminal device.

For the second channel announcement information, refer to the foregoing related description of the first channel announcement information. Principles are similar, and details are not described herein again.

Optionally, in S902, that the first terminal device determines the target channel in the plurality of candidate channels based on the channel usage information of the plurality of candidate channels may include the following steps:

The first terminal device determines at least one first channel in the plurality of candidate channels based on the channel usage information. Channel usage information of the first channel meets a first preset condition.

The first terminal device determines the target channel in the at least one first channel.

When specific content of the channel usage information is different, a corresponding first preset condition may be different. Optionally, the first preset condition may include at least one of the following conditions:

A channel estimated throughput is greater than or equal to a first preset value.

A channel busy ratio of a channel is less than a second preset value.

A signal-to-noise ratio of a channel is greater than or equal to a third preset value.

A quantity of established Wi-Fi peer-to-peer communication links on a channel is less than a fourth preset value.

A quantity of pairs of terminal devices that perform a Wi-Fi P2P service on a channel is less than the fourth preset value.

A quantity of terminal devices that perform a Wi-Fi P2P service on a channel is less than twice of the fourth preset value.

A maximum amplitude of a frequency component of a signal is less than a fifth preset value.

Optionally, the first preset condition may further include that background noise of the channel is less than a sixth preset value.

In this embodiment, names and specific values of the first preset value to the sixth preset value are not limited, and a quantity of conditions included in the first preset condition is not limited. For example, the first preset condition may include that the quantity of established Wi-Fi peer-to-peer communication links on a channel is less than the fourth preset value, and the background noise of the channel is less than the sixth preset value.

Optionally, the first terminal device determines the target channel in the at least one first channel. In an implementation, the target channel may be a channel with a maximum bandwidth in the at least one first channel. Optionally, if there are a plurality of channels with a maximum bandwidth, the target channel may be any channel with the maximum bandwidth. An example is used for description. It is assumed that the channel usage information includes a channel busy ratio of the channel, and the first preset condition includes that the channel busy ratio of the channel is less than the second preset value. Three first channels are determined from candidate channels based on the first preset condition, which are respectively 36/20 MHz, 149/20 MHz, and 52/40 MHz. The first terminal device may determine the first channel 52/40 MHz as the target channel. In this implementation, the channel with the maximum bandwidth in the at least one first channel is determined as the target channel, which further meets a throughput requirement of the target service, and further shortens a transmission delay of the target service.

Optionally, the first terminal device determines the target channel in the at least one first channel. In an implementation, the target channel may be a channel with a minimum bandwidth in the at least one first channel. Optionally, if there are a plurality of channels with a minimum bandwidth, the target channel may be any channel with the minimum bandwidth. An example is used for description. It is assumed that the channel usage information includes a channel busy ratio of the channel, and the first preset condition includes that the channel busy ratio of the channel is less than the second preset value. Four first channels are determined from the candidate channels based on the first preset condition, which are respectively 36/20 MHz, 40/20 MHz, 52/40 MHz, and 149/80 MHz. The first terminal device may determine the first channel 40/20 MHz as the target channel. In this implementation, the channel with the minimum bandwidth in the at least one first channel is determined as the target channel. In a scenario in which a plurality of pairs of terminal devices simultaneously perform Wi-Fi peer-to-peer communication, an idle channel is reserved for a subsequent Wi-Fi peer-to-peer communication link established by another terminal device, and subsequent frequent channel switching by the first terminal device caused by a gradual increase in a quantity of established Wi-Fi peer-to-peer communication links is avoided.

Optionally, the first terminal device determines the target channel in the at least one first channel. In still another implementation, if the channel usage information includes at least one of background noise of the channel, a channel busy ratio of the channel, a quantity of established Wi-Fi peer-to-peer communication links on the channel, or an amplitude of a frequency component of a signal, the target channel may be a channel with a minimum channel usage information value in the at least one first channel. If the channel usage information includes the channel estimated throughput, the target channel may be a channel with a maximum channel usage information value in the at least one first channel. Optionally, if there are a plurality of channels with the minimum value or the maximum value, the target channel may be any channel with the minimum value or the maximum value. An example is used for description. It is assumed that the channel usage information includes the quantity of established Wi-Fi peer-to-peer communication links on a channel, and the first preset condition includes that the quantity of established Wi-Fi peer-to-peer communication links on a channel is less than the fourth preset value. Three first channels are determined from the candidate channels based on the first preset condition, which are respectively 36/20 MHz, 52/40 MHz, and 149/80 MHz, and quantities of established Wi-Fi peer-to-peer communication links on each channel are respectively 0, 1, and 0. The first terminal device may determine the first channel 149/80 MHz as the target channel. In this implementation, a channel whose channel usage information value is the minimum or the maximum in the at least one first channel is determined as the target channel, which ensures that the target channel is a relatively idle channel, further reduces a probability that the first terminal device contends for a transmission resource with another terminal device on the target channel, reduces channel interference, and further reduces a transmission delay of the target service.

Optionally, the first terminal device determines the target channel in the at least one first channel. In still another implementation, a bandwidth of the first channel may be a preset channel bandwidth corresponding to the target service, and the target channel is any channel in the at least one first channel. An example is used for description. It is assumed that the target service is a wireless projection service, and a corresponding preset channel bandwidth is 20 MHz or 40 MHz. Three first channels are determined from the candidate channels based on the first preset condition, which are respectively 36/20 MHz, 52/40 MHz, and 149/20 MHz. The first terminal device may determine the first channel 36/20 MHz as the target channel.

It should be noted that the foregoing implementations of determining the target channel in the at least one first channel may be combined with each other. For example, the target channel may be a channel with a maximum bandwidth and a minimum channel usage information value in the at least one first channel. For another example, the target channel may be a channel with a minimum channel usage information value in the at least one first channel and with the preset channel bandwidth corresponding to the target service.

The following uses the conference scenario shown in FIG. 2 as an example to describe the communication method provided in the embodiment shown in FIG. 9 by using an example. However, application scenarios in this embodiment of this application are not limited in Example 1 to Example 5. Terminal devices A1-A8 are mobile phones, terminal devices B1-B8 are projection devices, and the first terminal device may be a mobile phone A1. The target service may be a wireless projection service, and a corresponding preset channel bandwidth and a minimum channel bandwidth are both 20 MHz. For a service triggering operation of a user, refer to a related operation in FIG. 3(a) to FIG. 3(f). Details are not described herein again. Candidate channels may include one 160 MHz channel, two 80 MHz channels, four 40 MHz channels, and eight 20 MHz channels in a range of 5170-5330 MHz. For example, the channel usage information may include the quantity of established Wi-Fi peer-to-peer communication links on a channel, and the first preset condition may include that the quantity of established Wi-Fi peer-to-peer communication links on a channel is less than 1. Scenarios of Example 1 to Example 3 are similar. Currently, there is only one user in a conference room who carries the mobile phone A1. For example, scenarios of Example 4 and Example 5 are similar. When the user carries the mobile phone A1 and enters the conference room, a plurality of pairs of terminal devices in the conference room have performed wireless projection.

Optionally, for Example 1, refer to FIG. 3(a) to FIG. 3(f) and FIG. 12. The mobile phone A1 receives a service triggering operation of a user, and performs a wireless projection service. The mobile phone A1 does not receive channel announcement information sent by another terminal device, and determines that quantities of established Wi-Fi peer-to-peer communication links on all candidate channels are 0, and all meet the first preset condition. The mobile phone A1 determines that the preset channel bandwidth corresponding to the wireless projection service is 20 MHz, and the mobile phone A1 may determine any channel that is in the candidate channels, that meets the first preset condition, and whose channel bandwidth is the preset channel bandwidth corresponding to the target service as the target channel, for example, 36/20 MHz. The mobile phone A1 may establish a Wi-Fi peer-to-peer communication link to a second terminal device B1 on the target channel 36/20 MHz, and perform a wireless projection service based on the communication link. Then, the mobile phone A1 may broadcast the channel announcement information on the channel 36/20 MHz, so as to indicate that a channel occupied by the Wi-Fi peer-to-peer communication link established by the mobile phone A1 is 36/20 MHz.

Figure 13:
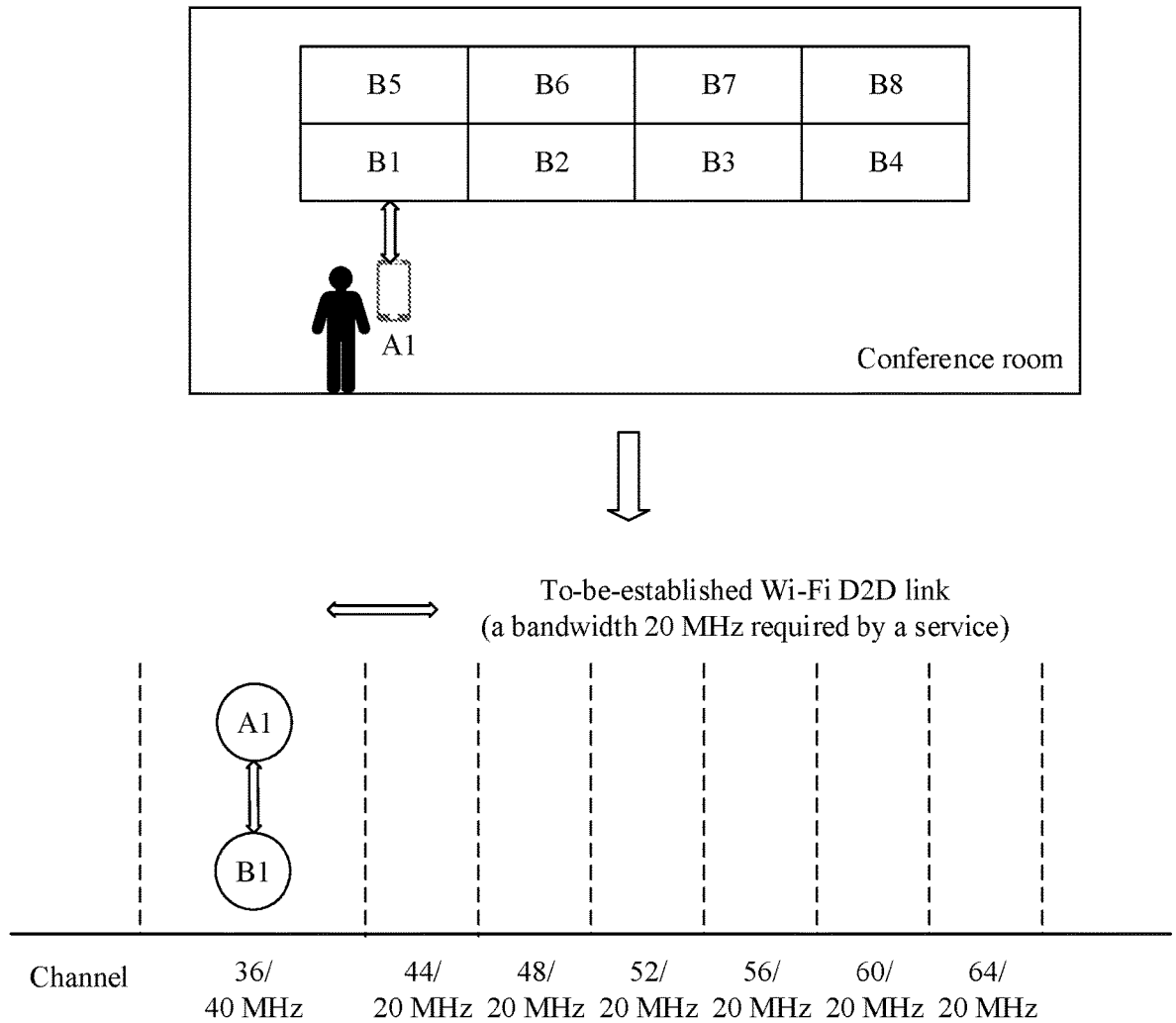
FIG. 13 is another schematic diagram of using a channel by a terminal device according to an embodiment of this application.

Optionally, for Example 2, refer to FIG. 13. A difference between this example and Example 1 lies in that the mobile phone A1 may determine any channel that meets the first preset condition in the candidate channels and whose channel bandwidth is greater than or equal to a minimum channel bandwidth corresponding to the target service as the target channel, for example, 36/40 MHz.

Figure 14:
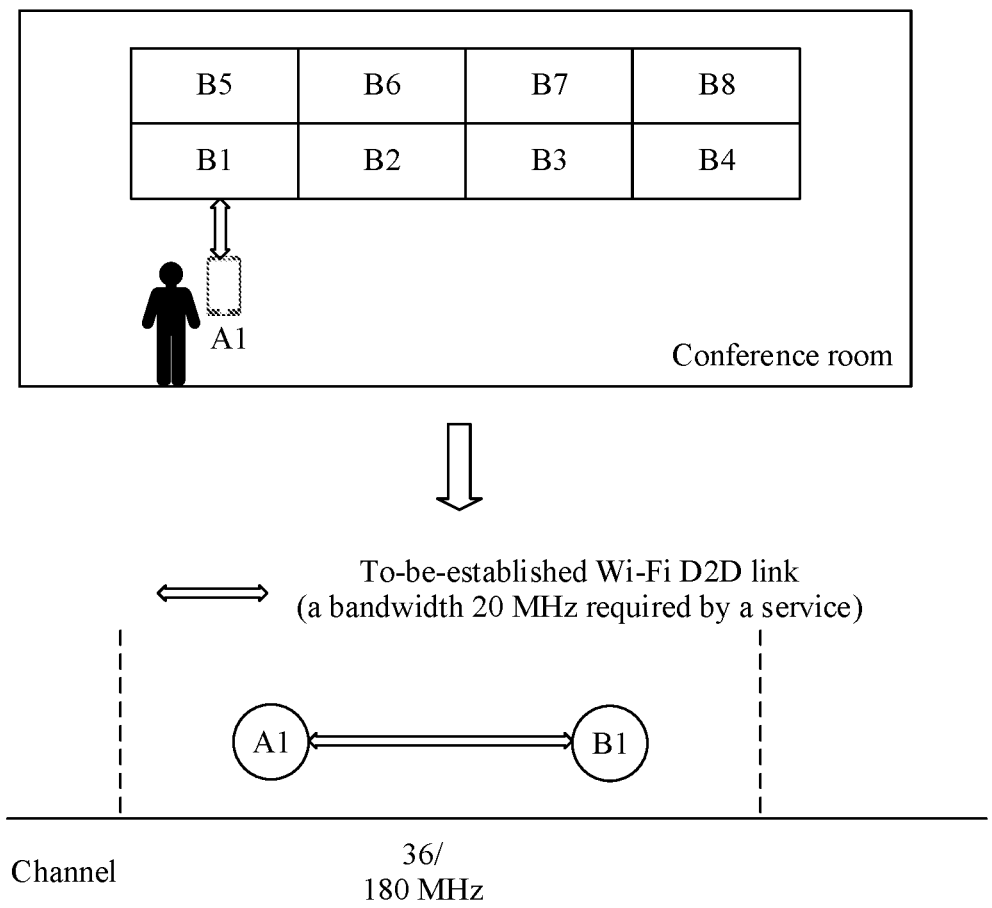
FIG. 14 is still another schematic diagram of using a channel by a terminal device according to an embodiment of this application.
Figure 15:
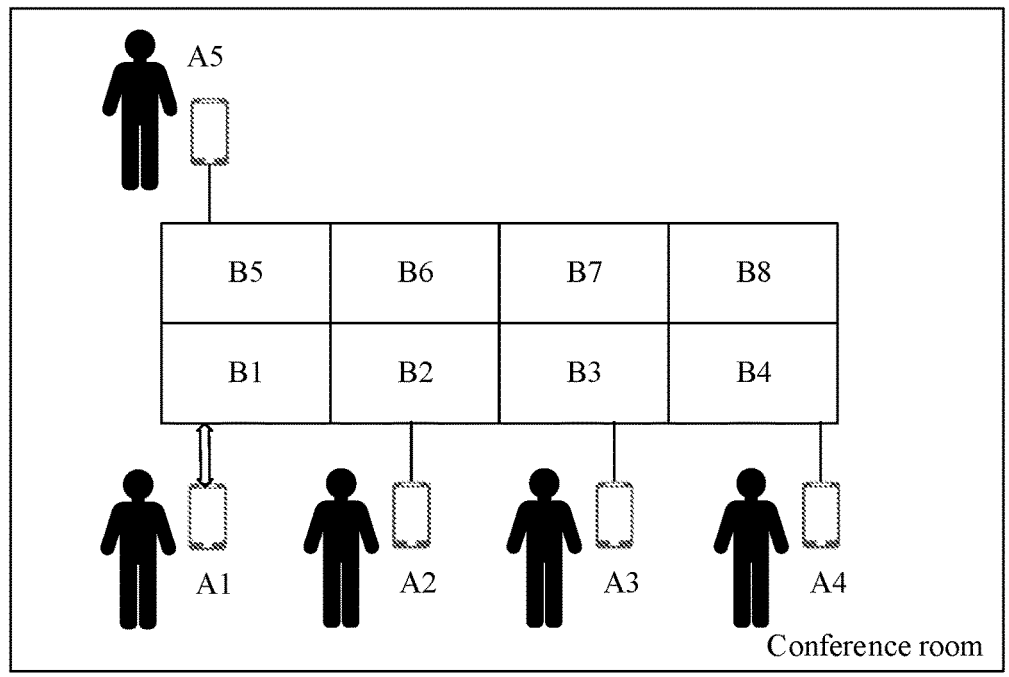
FIG. 15 is still another schematic diagram of using a channel by a terminal device according to an embodiment of this application.
Figure 15:
Figure 15:
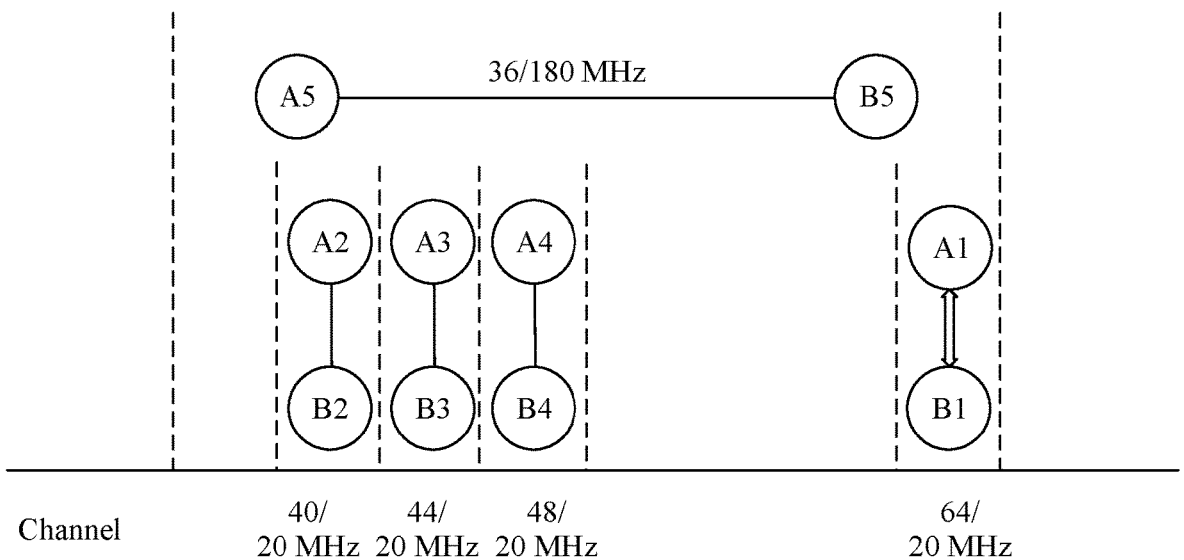

Optionally, for Example 3, refer to FIG. 14. A difference between this example and Example 1 lies in that the mobile phone A1 may determine any channel that meets the first preset condition in the candidate channels and whose channel bandwidth is the maximum as the target channel, for example, 36/180 MHz.

Optionally, for Example 4, refer to FIG. 3(a) to FIG. 3(f) and FIG. 15. When the user carries the mobile phone A1 and enters the conference room, four pairs of terminal devices that perform Wi-Fi peer-to-peer communication already exist in the conference room. The mobile phone A1 receives a service triggering operation of a user, and performs a wireless projection service. The mobile phone A1 receives channel announcement information separately broadcast by mobile phones A2-A5, and channels separately occupied by the mobile phones A2-A5 are 40/20 MHz, 44/20 MHz, 48/20 MHz, and 36/180 MHz. The mobile phone A1 determines that quantities of established Wi-Fi peer-to-peer communication links on candidate channels except the four channels are 0, and meet the first preset condition. The mobile phone A1 determines that the preset channel bandwidth corresponding to the wireless projection service is 20 MHz, and the mobile phone A1 may determine any channel that is in the candidate channels, that meets the first preset condition, and whose channel bandwidth is the preset channel bandwidth corresponding to the target service as the target channel, for example, 64/20 MHz. The mobile phone A1 may establish a Wi-Fi peer-to-peer communication link to a second terminal device B1 on the target channel 64/20 MHz, and perform a wireless projection service based on the communication link. Then, the mobile phone A1 may broadcast the channel announcement information on the channel 64/20 MHz, so as to indicate that a channel occupied by the Wi-Fi peer-to-peer communication link established by the mobile phone A1 is 64/20 MHz.

Figure 16:
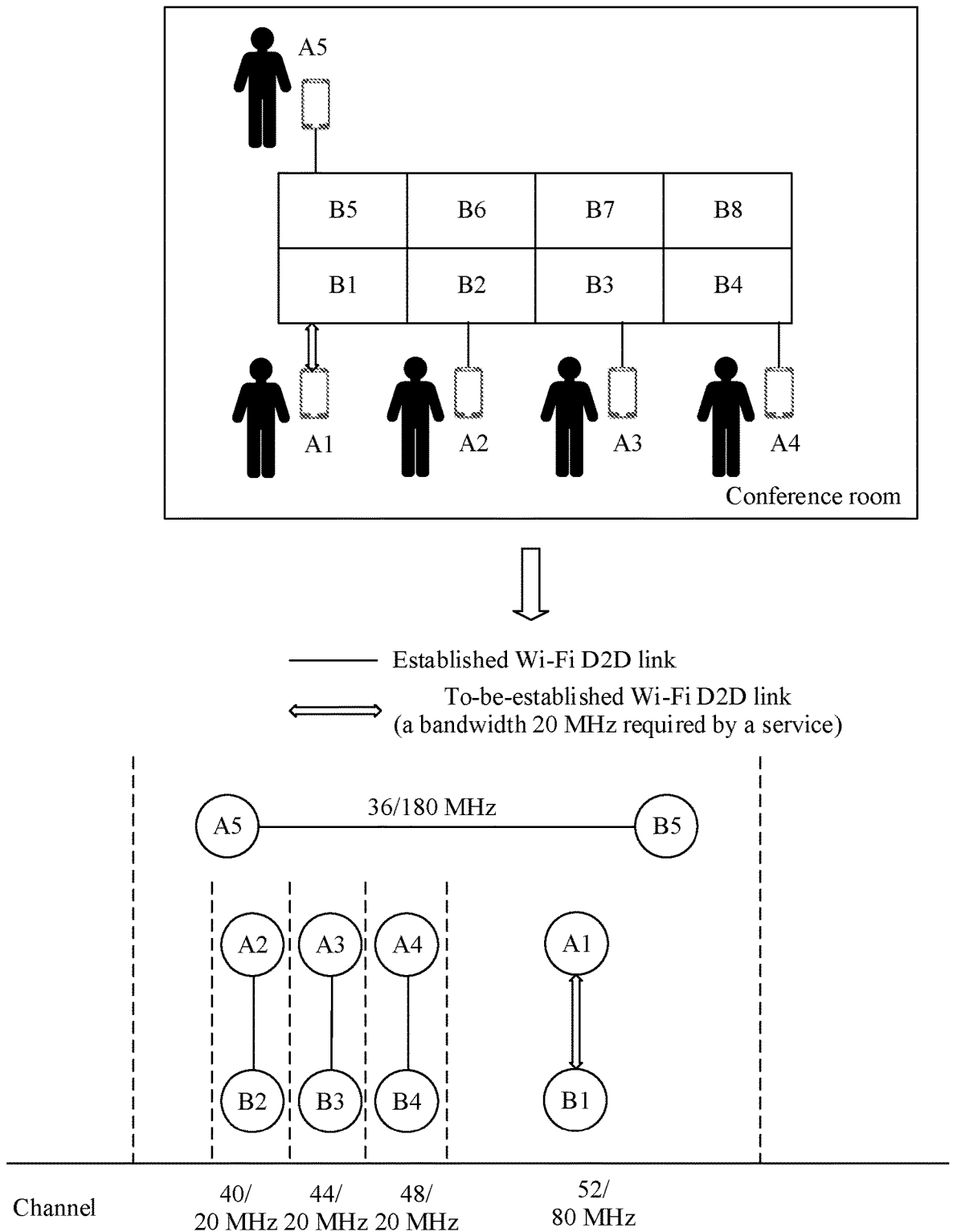
FIG. 16 is still another schematic diagram of using a channel by a terminal device according to an embodiment of this application.

Optionally, for Example 5, refer to FIG. 16. A difference between this example and Example 4 lies in that the mobile phone A1 may determine any channel that meets the first preset condition in the candidate channels and whose channel bandwidth is the maximum as the target channel, for example, 52/80 MHz.

Figure 17:
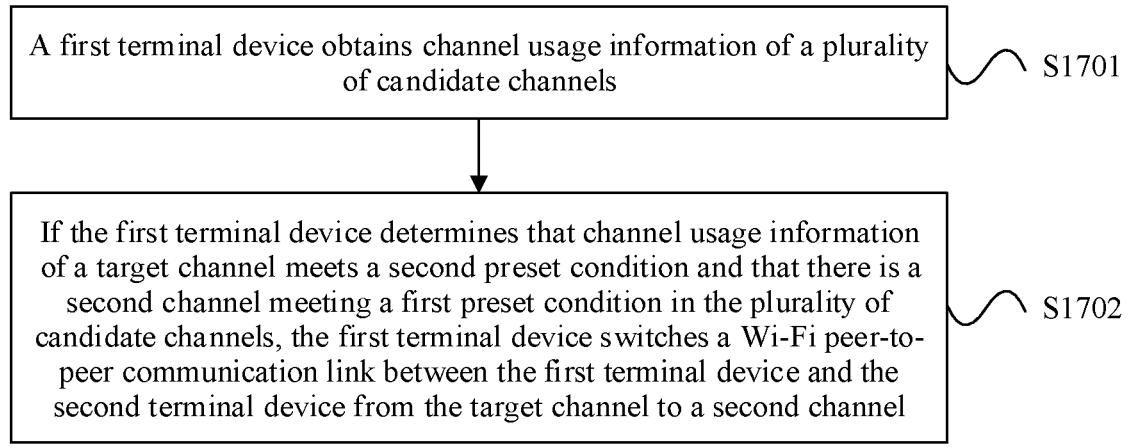
FIG. 17 is another flowchart of a communication method according to an embodiment of this application.

FIG. 17 is another flowchart of a communication method according to an embodiment of this application. The communication method provided in this embodiment may be applied to a phase in which a terminal device switches a channel after establishing a Wi-Fi peer-to-peer communication link. For ease of description, in the communication method provided in this embodiment, an execution body may be referred to as a first terminal device, and a terminal device that performs Wi-Fi peer-to-peer communication with the first terminal device may be referred to as a second terminal device. As shown in FIG. 17, the communication method provided in this embodiment may include the following steps:

S1701: The first terminal device obtains channel usage information of a plurality of candidate channels.

The plurality of candidate channels may have a plurality of bandwidths, there is at least one candidate channel of each bandwidth, and the channel usage information may be used to indicate an idle degree of a candidate channel.

For the candidate channel, the channel usage information, and an implementation of obtaining the channel usage information, refer to related descriptions in the embodiment shown in FIG. 9. Principles are similar, and details are not described herein again.

S1702: If the first terminal device determines that channel usage information of a target channel meets a second preset condition and that there is a second channel meeting a first preset condition in the plurality of candidate channels, the first terminal device switches a Wi-Fi peer-to-peer communication link between the first terminal device and the second terminal device from the target channel to a second channel.

The target channel is a channel currently occupied by the Wi-Fi peer-to-peer communication link between the first terminal device and the second terminal device.

For the first preset condition, refer to related descriptions in the embodiment shown in FIG. 9. Principles are similar, and details are not described herein again.

It can be learned that in the communication method provided in this embodiment, after establishing the Wi-Fi peer-to-peer communication link to the second terminal device on the target channel, the first terminal device may continue to obtain channel usage information of each candidate channel. If the first terminal device determines, based on the channel usage information of each candidate channel, that a currently occupied target channel is relatively busy and there is a relatively idle second channel in another channel, the first terminal device may switch from the target channel to the second channel, which reduces a probability that the first terminal device contends for a transmission resource with another terminal device on the second channel, reduces channel interference, reduces a transmission delay of performing a service by the first terminal device, and increases a throughput of an entire system.

When specific content of the channel usage information is different, a corresponding second preset condition may be different. Optionally, the second preset condition may include at least one of the following conditions:

A channel estimated throughput is less than a seventh preset value.

A channel busy ratio of a channel is greater than or equal to an eighth preset value.

A signal-to-noise ratio of a channel is less than a ninth preset value.

A quantity of established Wi-Fi peer-to-peer communication links on a channel is greater than or equal to a tenth preset value.

A quantity of pairs of terminal devices that perform a Wi-Fi P2P service on a channel is greater than or equal to the tenth preset value.

A quantity of terminal devices that perform a Wi-Fi P2P service on a channel is greater than or equal to twice of the tenth preset value.

A maximum amplitude of a frequency component of a signal is greater than or equal to an eleventh preset value.

Optionally, the second preset condition may further include that background noise of a channel is greater than or equal to a twelfth preset value.

Names and specific values of the seventh preset value to the twelfth preset value are not limited in this embodiment.

Optionally, there may be one or more channels that meet the first preset condition in a plurality of candidate channels. If there are a plurality of channels that meet the first preset condition in the plurality of candidate channels, for an implementation of determining the second channel from the plurality of channels that meet the first preset condition, refer to related descriptions of determining, by the first terminal device, the target channel in the at least one first channel in the embodiment shown in FIG. 9. Principles are similar, and details are not described herein again.

The following uses the conference scenario shown in FIG. 2 as an example to describe the communication method provided in the embodiment shown in FIG. 17 by using an example. However, application scenarios in this embodiment of this application are not limited in Example 6 to Example 9. The terminal devices A1-A8 are mobile phones, the terminal devices B1-B8 are projection devices, and the first terminal device may be a mobile phone A1. The target service may be a wireless projection service, and a corresponding preset channel bandwidth and a minimum channel bandwidth are both 20 MHz. Candidate channels may include one 160 MHz channel, three 80 MHz channels, six 40 MHz channels, and thirteen 20 MHz channels in ranges of 5170-5330 MHz and 5735-5835 MHz. For example, the channel usage information may include background noise of a channel and the quantity of established Wi-Fi peer-to-peer communication links on a channel. The first preset condition may include that the background noise of the channel is less than the sixth preset value, and the quantity of established Wi-Fi peer-to-peer communication links on a channel is less than 1. The second preset condition may include that the quantity of established Wi-Fi peer-to-peer communication links on a channel is greater than 1.

Figure 18:
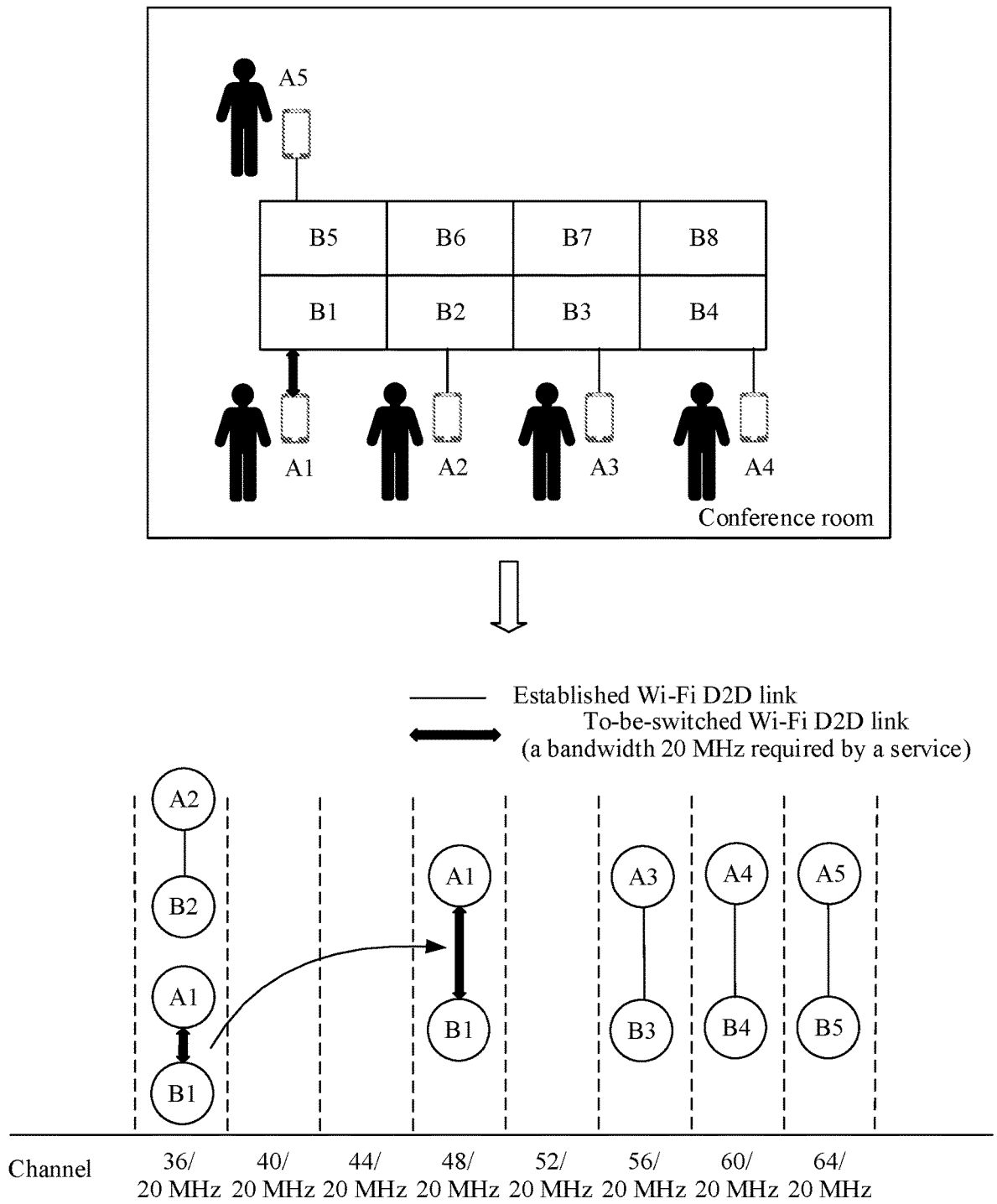
FIG. 18 is still another schematic diagram of using a channel by a terminal device according to an embodiment of this application.

Optionally, for Example 6, refer to FIG. 18. The mobile phone A1 and a terminal device B1 establish a Wi-Fi peer-to-peer communication link on a channel 36/20 MHz (target channel). The mobile phone A1 may obtain background noise of each channel through Wi-Fi protocol scanning. The mobile phone A1 further receives channel announcement information broadcast by the mobile phones A2-A5, and learns of channels occupied by the mobile phones A2-A5. The mobile phone A1 determines that there are two established Wi-Fi peer-to-peer communication links on the channel 36/20 MHz, which meets the second preset condition. It is assumed that channels that meet the first preset condition in the plurality of candidate channels include a channel 44/40 MHz, a channel 40/20 MHz, a channel 44/20 MHz, a channel 48/20 MHz, and a channel 52/20 MHz. The mobile phone A1 may determine any channel that is in the candidate channels, that meets the first preset condition, and whose channel bandwidth is a preset channel bandwidth corresponding to the target service as the second channel, for example, the channel 48/20 MHz. The mobile phone A1 may switch a Wi-Fi peer-to-peer communication link to the terminal device B1 from the target channel 36/20 MHz to the second channel 48/20 MHz. In this example, a bandwidth of the second channel is the same as a bandwidth of the target channel. Switching from a relatively busy channel 36/20 MHz to a relatively idle channel 48/20 MHz avoids a case that the mobile phone A1 contends for a transmission resource with another terminal device on the channel 48/20 MHz, reduces a transmission delay of performing a wireless projection service by the mobile phone A1, and increases a throughput of an entire system.

Figure 19:
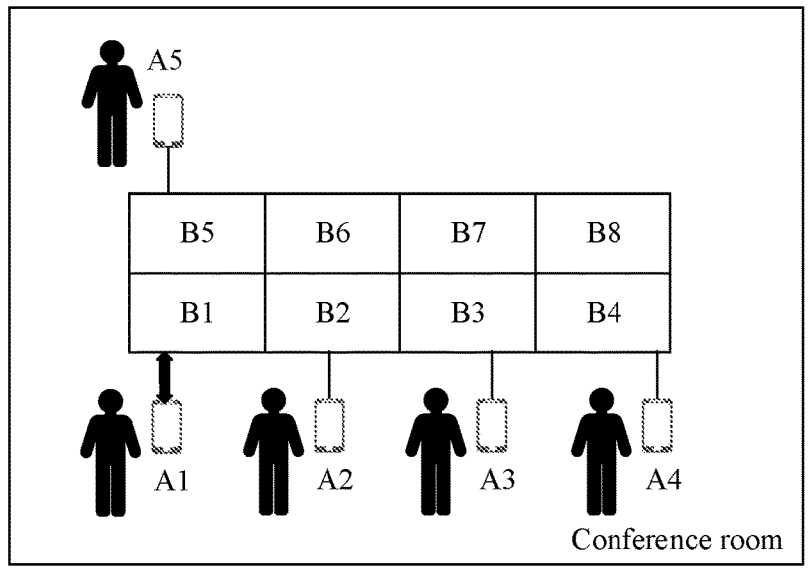
FIG. 19 is still another schematic diagram of using a channel by a terminal device according to an embodiment of this application.
Figure 19:
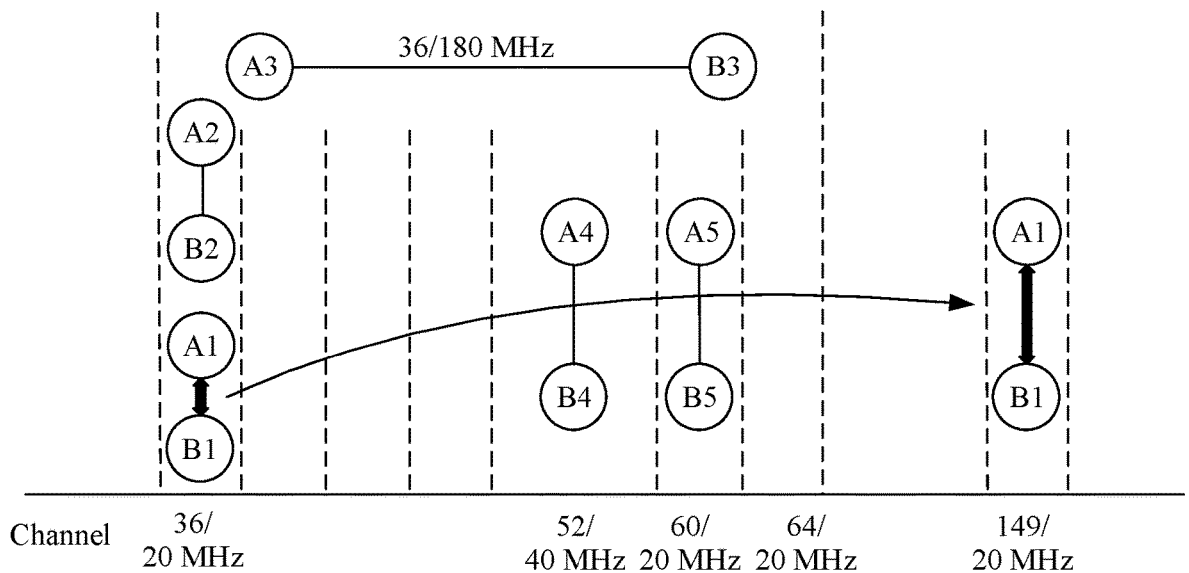

Optionally, for Example 7, refer to FIG. 19. In this example, it is assumed that channels that meet the first preset condition in the plurality of candidate channels include a channel 44/40 MHz, a channel 40/20 MHz, a channel 44/20 MHz, a channel 48/20 MHz, a channel 64/20 MHz, and a channel 149/20 MHz. A difference between this example and Example 1 lies in that the mobile phone A1 may determine any channel that meets the first preset condition in the candidate channels and whose background noise is the minimum as the second channel, for example, 149/20 MHz. In this example, the bandwidth of the second channel is the same as the bandwidth of the target channel.

Figure 20:
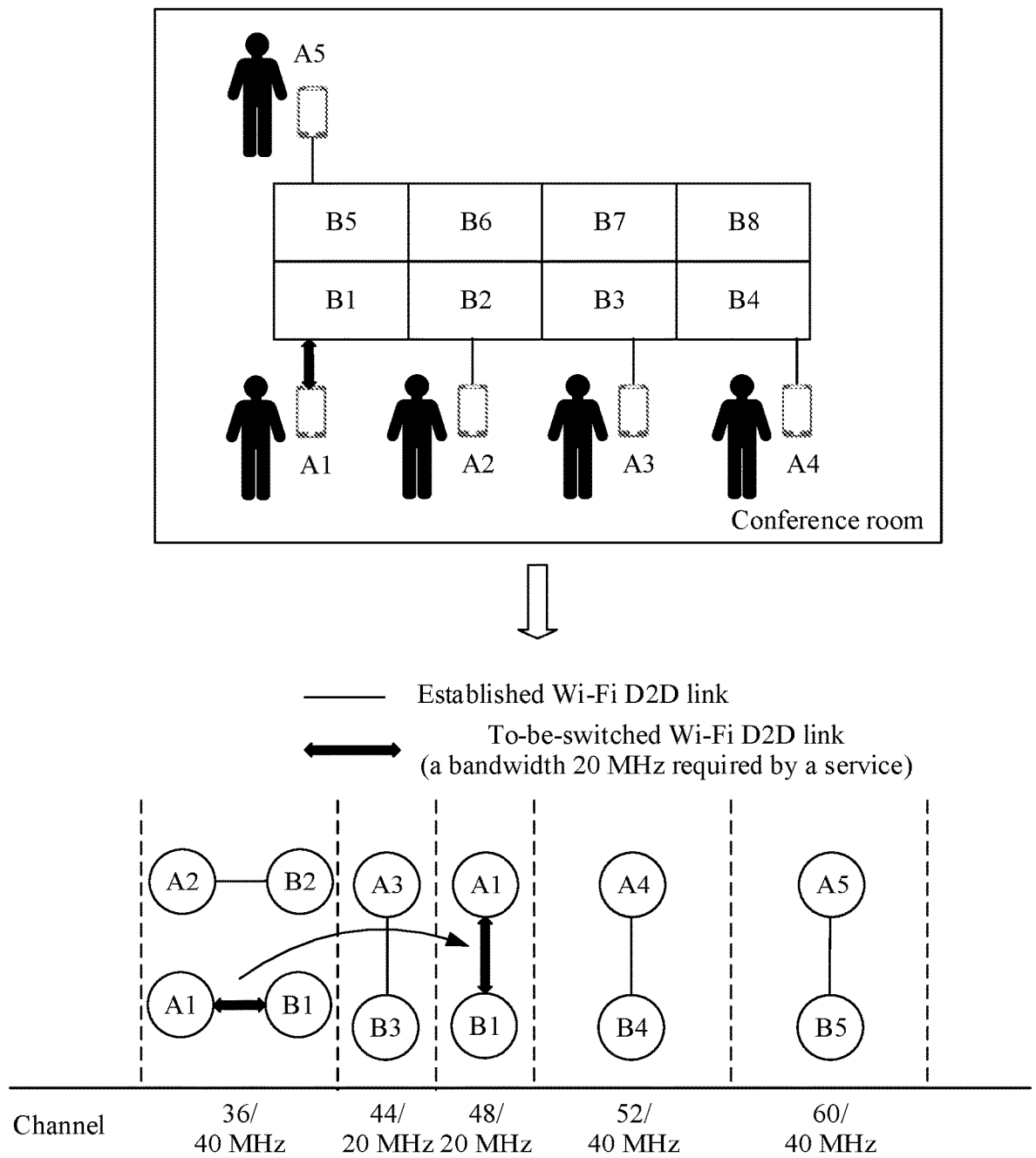
FIG. 20 is still another schematic diagram of using a channel by a terminal device according to an embodiment of this application.

Optionally, for Example 8, refer to FIG. 20. In this example, it is assumed that channels that meet the first preset condition in the plurality of candidate channels include a channel 44/40 MHz and a channel 48/20 MHz. A difference between this example and Example 1 lies in that the mobile phone A1 may determine any channel that meets the first preset condition in the candidate channels and whose channel bandwidth is greater than or equal to a minimum channel bandwidth corresponding to the target service as the second channel, for example, 48/20 MHz. In this example, the bandwidth of the second channel is less than the bandwidth of the target channel, which still meets a throughput requirement of a wireless projection service.

Figure 21:
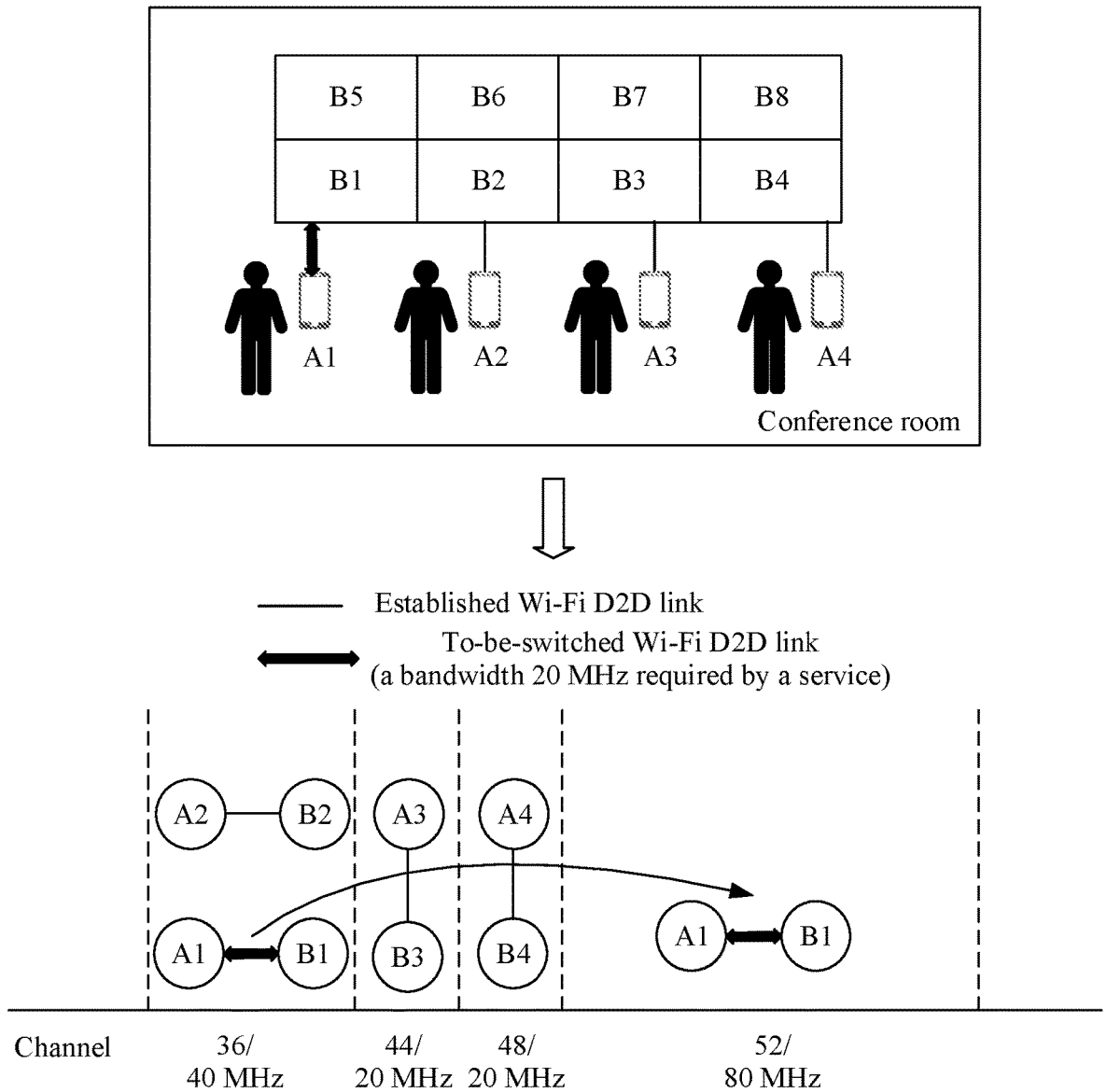
FIG. 21 is still another schematic diagram of using a channel by a terminal device according to an embodiment of this application.

Optionally, for Example 9, refer to FIG. 21. In this example, it is assumed that channels that meet the first preset condition in the plurality of candidate channels include a channel 52/20 MHz, a channel 56/20 MHz, a channel 60/20 MHz, a channel 64/20 MHz, a channel 52/40 MHz, a channel 60/40 MHz, and a channel 52/80 MHz. A difference between this example and Example 1 lies in that the mobile phone A1 may determine any channel that meets the first preset condition in the candidate channels and whose channel bandwidth is the maximum as the target channel, for example, the channel 52/80 MHz. In this example, the bandwidth of the second channel is greater than the bandwidth of the target channel.

Figure 22:
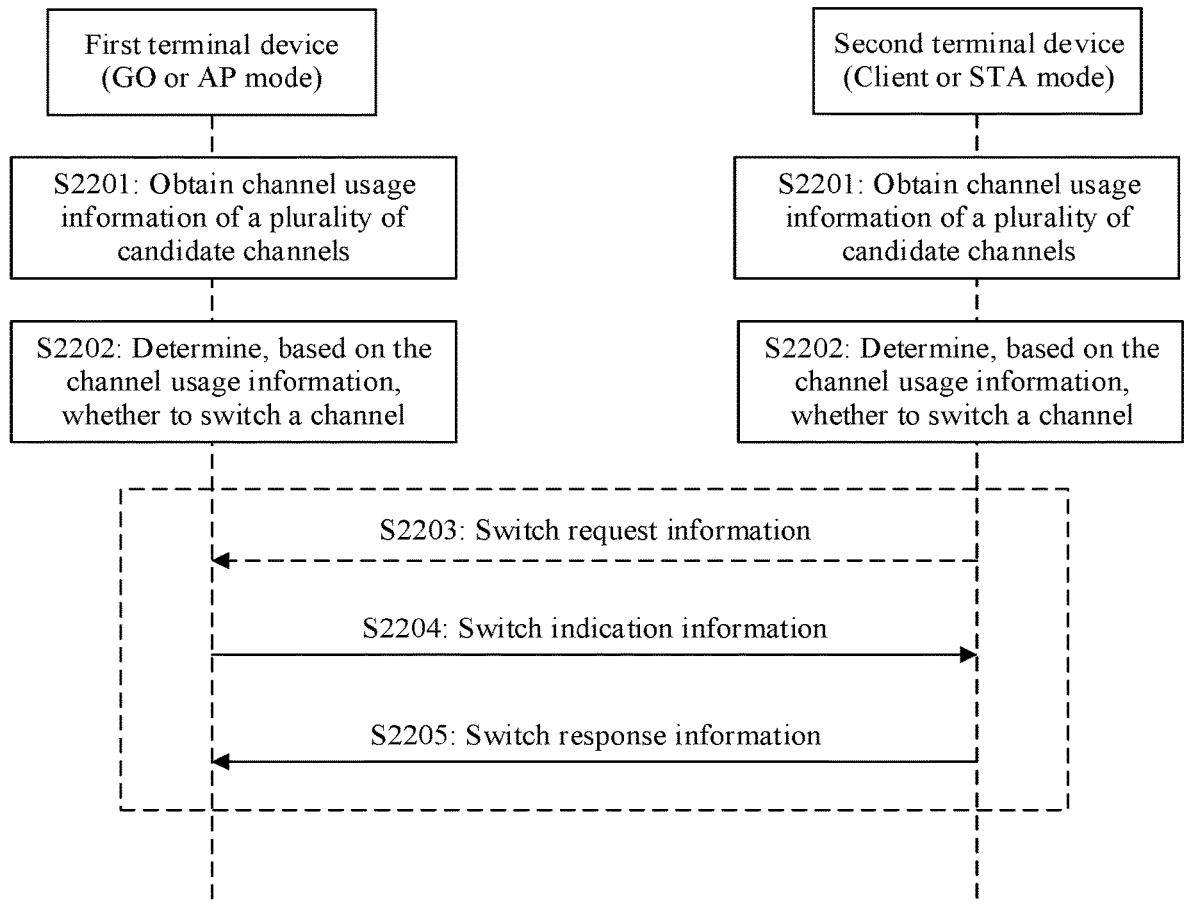
FIG. 22 is still another flowchart of a communication method according to an embodiment of this application.

FIG. 22 is still another flowchart of a communication method according to an embodiment of this application. The communication method provided in this embodiment may be applied to a phase in which a terminal device switches a channel after establishing a Wi-Fi peer-to-peer communication link. An execution body relates to a first terminal device and a second terminal device. For ease of description, when the first terminal device and the second terminal device work in a Wi-Fi P2P mode, the first terminal device may be a group owner (GO), and the second terminal device may be a client (client). Alternatively, the first terminal device works in an AP mode, and the second terminal device works in a STA mode. As shown in FIG. 22, the communication method provided in this embodiment may include the following steps:

S2201: The first terminal device and/or the second terminal device obtain channel usage information of a plurality of candidate channels.

The plurality of candidate channels may have a plurality of bandwidths, there is at least one candidate channel of each bandwidth, and the channel usage information may be used to indicate an idle degree of a candidate channel.

For the candidate channel, the channel usage information, and an implementation of obtaining the channel usage information, refer to related descriptions in the embodiment shown in FIG. 9. Principles are similar, and details are not described herein again.

This embodiment sets no limitation on execution time of obtaining channel usage information of a plurality of candidate channels by the first terminal device and obtaining channel usage information of a plurality of candidate channels by the second terminal device.

S2202: The first terminal device and/or the second terminal device determine, based on the channel usage information, whether to switch a channel.

In this embodiment, any one of the first terminal device and the second terminal device may determine, based on the channel usage information, whether channel switching needs to be performed, and then the first terminal device initiates a channel switching procedure. For a determining condition for determining whether to switch a channel, refer to descriptions of S1702 in the embodiment shown in FIG. 17. Details are not described herein again.

Optionally, in an implementation, the first terminal device determines to switch a channel, and the first terminal device may directly initiate a channel switching procedure. After S2202, the communication method provided in this embodiment may further include the following steps:

S2204: The first terminal device sends switch indication information to the second terminal device. The switch indication information is used to notify the second terminal device to perform channel switching. Correspondingly, the second terminal device receives the switch indication information sent by the first terminal device.

A name of the switch indication information and specific content included in the switch indication information are not limited in this embodiment. For example, the switch indication information may be a management frame (action frame) that carries a channel switch announcement (channel switch announcement, CSA) and that is specified in a Wi-Fi protocol, and the frame may include agreed switching time.

S2205: The second terminal device sends switch response information to the first terminal device. The switch response information is used to indicate that the second terminal device receives the switch indication information. Correspondingly, the first terminal device receives the switch response information sent by the second terminal device.

Then, the first terminal device and the second terminal device may switch from a current channel to a specified channel.

A name of the switch response information and specific content included in the switch response information are not limited in this embodiment. For example, the switch response information may be an ACK specified in the Wi-Fi protocol.

Optionally, in another implementation, the second terminal device determines to switch a channel. In this case, the second terminal device needs to notify the first terminal device to initiate switching. After S2202, the communication method provided in this embodiment may further include the following steps:

S2203: The second terminal device sends switch request information to the first terminal device. The switch request information is used to notify the first terminal device to initiate channel switching. Correspondingly, the first terminal device receives the switch request information sent by the second terminal device.

A name of the switch request information and specific content included in the switch request information are not limited in this embodiment. For example, the switch request information may include but is not limited to agreed switching time or channel information of a specified channel switched to.

S2204: The first terminal device sends switch indication information to the second terminal device.

S2205: The second terminal device sends switch response information to the first terminal device.

It can be understood that, to implement the foregoing functions, the terminal device includes corresponding hardware and/or software modules for implementing each function. With reference to example algorithm steps described in embodiments disclosed in this specification, this application can be implemented in a form of hardware or a combination of hardware and computer software. Whether a function is performed by hardware or hardware driven by computer software depends on a particular application and a design constraint of the technical solutions. A person of ordinary skill in the art may use different methods to implement the described functions for each particular application with reference to embodiments, but it should not be considered that the implementation goes beyond the scope of this application.

In this embodiment of this application, the terminal device may be divided into function modules based on the foregoing method example. For example, function modules may be divided corresponding to functions, or two or more functions may be integrated into one processing module. The foregoing integrated module may be implemented in a hardware form. It should be noted that, in embodiments of this application, division into the modules is an example and is merely logical function division, and may be other division in an actual implementation.

Figure 23:
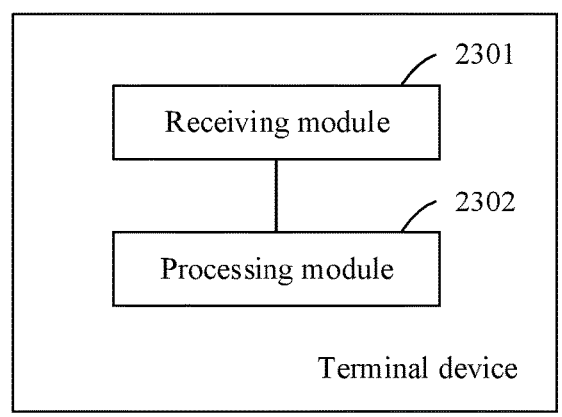
FIG. 23 is a schematic diagram of a structure of a terminal device according to an embodiment of this application.

When function modules are divided corresponding to functions, FIG. 23 is a schematic diagram of a structure of a terminal device according to an embodiment of this application. As shown in FIG. 23, the terminal device may include a receiving module 2301 and a processing module 2302.

The receiving module 2301 is configured to receive a service triggering operation of a user.

The processing module 2302 is configured to determine a target channel in a plurality of candidate channels based on channel usage information of the plurality of candidate channels in response to the service triggering operation. The plurality of candidate channels may have a plurality of bandwidths, there is at least one candidate channel of each bandwidth, and the channel usage information may be used to indicate an idle degree of a candidate channel.

The processing module 2302 is further configured to: establish a Wi-Fi peer-to-peer communication link to a second terminal device on the target channel, and perform a target service based on the Wi-Fi peer-to-peer communication link to the second terminal device.

It should be noted that, all related content of steps in the foregoing method embodiments may be cited in function descriptions of corresponding functional modules. Details are not described herein again.

The processing module may be a processor or a controller. The processing module may implement or execute logical blocks, modules, and circuits in various examples described with reference to content disclosed in this application. The processor may also be a combination for implementing computing functions, for example, a combination including one or more microprocessors, and a combination of digital signal processing (digital signal processing, DSP) and a microprocessor. The storage module may be a memory. A communication module may be specifically a device that interacts with another electronic device, such as a radio frequency circuit, a Bluetooth chip, or a Wi-Fi chip.

Figure 24:
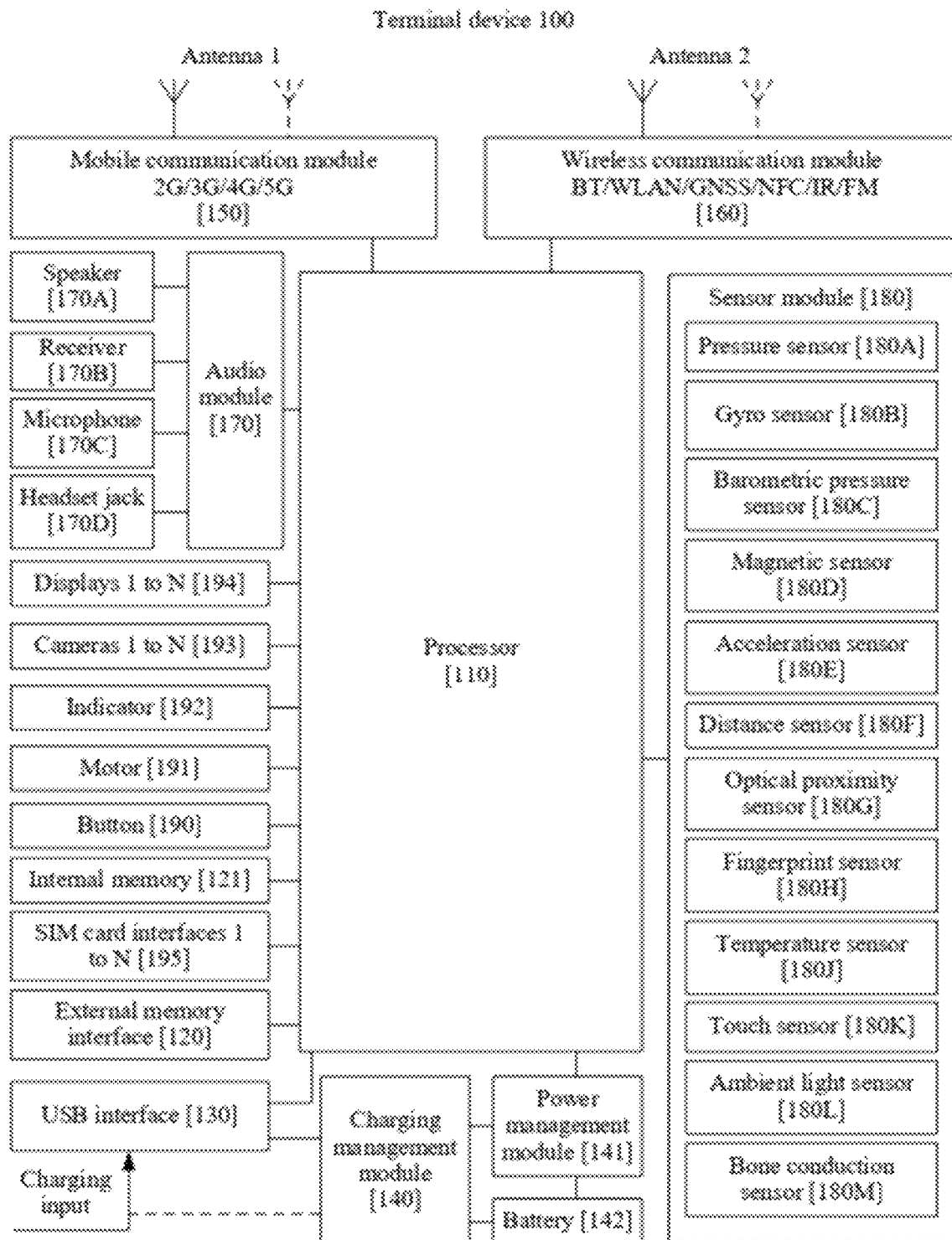
FIG. 24 is a schematic diagram of another structure of a terminal device according to an embodiment of this application.

An embodiment of this application further provides a terminal device. FIG. 24 is a schematic diagram of another structure of a terminal device according to an embodiment of this application.

As shown in FIG. 24, the terminal device 100 may include a processor 110, an external memory interface 120, an internal memory 121, a universal serial bus (Universal Serial Bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (Subscriber Identification Module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the terminal device 100. In some other embodiments of this application, the terminal device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (Application Processor, AP), a modem processor, a graphics processing unit (Graphics Processing Unit, GPU), an image signal processor (Image Signal Processor, ISP), a controller, a memory, a video codec, a digital signal processor (Digital Signal Processor, DSP), a baseband processor, and/or a neural-network processing unit (Neural-network Processing Unit, NPU). Different processing units may be independent devices, or may be integrated into one or more processors.

The controller may be a nerve center and a command center of the terminal device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (Inter-Integrated Circuit, I2C) interface, an inter-integrated circuit sound (Inter-Integrated circuit Sound, I2S) interface, a pulse code modulation (Pulse Code Modulation, PCM) interface, a universal asynchronous receiver/transmitter (Universal Asynchronous Receiver/Transmitter, UART) interface, a mobile industry processor interface (Mobile Industry Processor Interface, MIPI), a general-purpose input/output (General-Purpose Input/Output, GPIO) interface, a subscriber identity module (Subscriber Identity Module, SIM) interface, a universal serial bus (Universal Serial Bus, USB) interface, and/or the like.

The I2C interface is a two-way synchronization serial bus, and includes one serial data line (Serial Data Line, SDA) and one serial clock line (Serial Clock Line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, and analog signal sampling, quantization, and coding. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (Camera Serial Interface, CSI), a display serial interface (Display Serial Interface, DSI), and the like. In some embodiments, the processor 110 communicates with the camera 193 through the CSI, to implement a photographing function of the terminal device 100. The processor 110 communicates with the display 194 through the DSI, to implement a display function of the terminal device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the terminal device 100, or may be configured to transmit data between the terminal device 100 and a peripheral device, or may be configured to connect to a headset, to play audio by using the headset. The interface may be further configured to connect to another terminal device, such as an AR device.

It can be understood that an interface connection relationship between modules shown in this embodiment of this application is merely a schematic description, and does not constitute a structure limitation on the terminal device 100. In some other embodiments of this application, the terminal device 100 may alternatively use an interface connection manner different from that in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the terminal device 100. The charging management module 140 may further supply power to the terminal device by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may also be disposed in a same component.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution, including 2G/3G/4G/5G, which is applied to the terminal device 100. The mobile communication module 150 may include at least one filter, a switch, a power amplifier, a low noise amplifier (Low Noise Amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution that is applied to the terminal device 100, and that includes a wireless local area network (Wireless Local Area Networks, WLAN) (for example, a wireless fidelity (Wireless Fidelity, Wi-Fi) network), Bluetooth (Bluetooth, BT), a global navigation satellite system (Global Navigation Satellite System, GNSS), frequency modulation (Frequency Modulation, FM), a near field communication (Near Field Communication, NFC) technology, an infrared (Infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the terminal device 100 are coupled, and the antenna 2 and the wireless communication module 160 in the terminal device 100 are coupled, so that the terminal device 100 can communicate with a network and another device by using a wireless communication technology. The wireless communication technology may include a global system for mobile communications (Global System for Mobile Communications, GSM), a general packet radio service (General Packet Radio Service, GPRS), code division multiple access (Code Division Multiple Access, CDMA), wideband code division multiple access (Wideband Code Division Multiple Access, WCDMA), time division-synchronous code division multiple access (Time Division-Synchronous Code Division Multiple Access, TD-SCDMA), long term evolution (Long Term Evolution, LTE), BT, a GNSS, a WLAN, NFC, FM, an IR technology, and/or the like. The GNSS may include a global positioning system (Global Positioning System, GPS), a global navigation satellite system (Global Navigation Satellite System, GNSS), a BeiDou navigation satellite system (BeiDou Navigation Satellite System, BDS), a quasi-zenith satellite system (Quasi-Zenith Satellite System, QZSS), and/or satellite based augmentation systems (Satellite Based Augmentation Systems, SBAS).

The terminal device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flexible light-emitting diode (Flex Light-Emitting Diode, FLED), a mini-LED, a micro-LED, a micro-OLED, a quantum dot light emitting diode (Quantum Dot Light Emitting Diode, QLED), or the like. In some embodiments, the terminal device 100 may include one or N displays 194, where N is a positive integer greater than 1.

The terminal device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the terminal device 100 may include one or N cameras 193, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transform on frequency energy.

The video codec is configured to: compress or decompress a digital video. The terminal device 100 may support one or more video codecs. Therefore, the terminal device 100 may play or record videos in a plurality of coding formats, for example, moving picture experts group (Moving Picture Experts Group, MPEG)-1, MPEG-2, MPEG-3, and MPEG-4.

The NPU is a neural-network (Neural-Network, NN) computing processor. The NPU quickly processes input information with reference to a structure of a biological neural network, for example, a transfer mode between human brain neurons, and may further continuously perform self-learning. Applications such as intelligent cognition of the terminal device 100, for example, image recognition, facial recognition, speech recognition, and text understanding, may be implemented through the NPU.

The external memory interface 120 may be used to connect to an external storage card, for example, a micro SD card, to extend a storage capability of the terminal device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 implements various function applications and data processing of the terminal device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the terminal device 100. In addition, the internal memory 121 may include a high-speed random access memory, and may further include a nonvolatile memory, for example, at least one magnetic disk storage device, a flash memory device, or a universal flash storage (Universal Flash Storage, UFS).

The terminal device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The terminal device 100 may be used to listen to music or answer a hands-free call by using the speaker 170A.

The receiver 170B, also referred to as an "earpiece", is configured to convert an electrical audio signal into a sound signal. When a call is answered or audio information is listened to by using the terminal device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. The terminal device 100 may be disposed with at least one microphone 170C. In some other embodiments, two microphones 170C may be disposed in the terminal device 100, to collect a sound signal and further implement a noise reduction function. In some other embodiments, three, four, or more microphones 170C may alternatively be disposed in the terminal device 100, to collect a sound signal, implement noise reduction, identify a sound source, implement a directional recording function, and the like.

The headset jack 170D is configured to connect to a wired headset. The headset jack 170D may be the USB interface 130 or a 3.5 mm open mobile terminal platform (Open Mobile Terminal Platform, OMTP) standard interface or a cellular telecommunications industry association of the USA (Cellular Telecommunications Industry Association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines strength of the pressure based on a change of the capacitance. When a touch operation is performed on the display 194, the terminal device 100 detects intensity of the touch operation through the pressure sensor 180A. The terminal device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180B may be configured to determine a motion gesture of the terminal device 100. In some embodiments, an angular velocity of the terminal device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the terminal device 100 calculates an altitude based on a value of the barometric pressure measured by the barometric pressure sensor 180C, to assist in positioning and navigation.

The magnetic sensor 180D includes a Hall sensor. The terminal device 100 may detect, by using the magnetic sensor 180D, opening and closing of a flip leather cover. In some embodiments, when the terminal device 100 is a flip phone, the terminal device 100 may detect opening and closing of the flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the terminal device 100. When the terminal device 100 is still, a magnitude and a direction of gravity can be detected. The acceleration sensor 180E may be further configured to identify a posture of the terminal device, and is used in an application such as switching between landscape mode and portrait mode or a pedometer.

The distance sensor 180F is configured to measure a distance. The terminal device 100 may measure a distance by using an infrared ray or laser. In some embodiments, in a photographing scenario, the terminal device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The terminal device 100 emits infrared light outward by using the light-emitting diode. The terminal device 100 detects infrared reflected light from a nearby object by using the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, by using the optical proximity sensor 180G, that a user holds the terminal device 100 in proximity to an ear to perform a call, so as to automatically turn off a screen to save electricity. The optical proximity sensor 180G may also be used in a leather case mode or a pocket mode to automatically unlock or lock the screen.

The ambient light sensor 180L is configured to sense ambient light brightness. The terminal device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the terminal device 100 is in a pocket, to avoid an accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy based on the temperature detected by the temperature sensor 180J. For example, when the temperature reported by the temperature sensor 180J exceeds a threshold, the terminal device 100 degrades performance of a processor near the temperature sensor 180J, to reduce power consumption for thermal protection. In some other embodiments, when the temperature is lower than another threshold, the terminal device 100 heats the battery 142, so as to avoid abnormal shutdown of the terminal device 100 due to a low temperature. In some other embodiments, when the temperature is less than still another threshold, the terminal device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the terminal device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive button input to generate button signal input related to user setting and function control of the terminal device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The terminal device 100 interacts with a network through the SIM card, to implement functions such as calling and data communication. In some embodiments, the terminal device 100 uses an eSIM, that is, an embedded SIM card. The eSIM card may be embedded in the terminal device 100, and cannot be separated from the terminal device 100.

The terminal device provided in this embodiment may perform the foregoing method embodiments, and an implementation principle and a technical effect thereof are similar. Details are not described herein again.

An embodiment of this application further provides a computer-readable storage medium. The computer-readable storage medium stores computer instructions. When the computer instructions run on an electronic device, a terminal device performs the foregoing related method steps to implement the method in the foregoing embodiment.

An embodiment of this application further provides a computer program product. When the computer program product runs on a computer, the computer performs the foregoing related steps, so as to implement the method in the foregoing embodiment.

It should also be understood that the term "and/or" used in this application refers to any combination of one or more of associated listed items and all possible combinations, and includes these combinations. The terms "first", "second", "third", and the like are used only to distinguish between descriptions, and should not be understood to indicate or imply relative importance.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A communication method performed by a terminal device, the method comprising:
receiving, by a terminal device, a first operation input to the terminal device;
determining, by the terminal device, a maximum bandwidth supported by the terminal device;
implementing, by the first terminal device using a first channel, a wireless fidelity peer-to-peer (Wi-Fi P2P) service in response to the first operation using the maximum bandwidth determined by the terminal device as the first channel, wherein the maximum bandwidth of the first channel is 80 MHz or 160 MHz;
detecting, by the terminal device, that a signal-to-noise ratio and/or a channel load of the first channel meet a first preset condition; and
automatically switching, by the first-terminal device, from the first channel to a second channel to perform the Wi-Fi P2P service upon detecting that the signal-to-noise ratio and/or a channel load of the first channel meet the first preset condition to continue to perform the Wi-Fi P2P service, wherein a bandwidth of the second channel is 20 MHz or 40 MHZ;
automatically switching, by the first-terminal device, from the second channel to a fourth channel to perform the Wi-Fi P2P service when detecting that a signal-to-noise ratio and/or a channel load of the second channel meet the first preset condition and a signal-to-noise ratio and/or a channel load of a fourth channel meet a second preset condition, wherein a bandwidth of the fourth channel is the maximum bandwidth supported by the terminal device;
obtaining, by the terminal device based on the first information, a quantity of other terminal devices that perform the Wi-Fi P2P service on the second channel; and
if the terminal device determines that the quantity of other terminal devices that perform the Wi-Fi P2P service on the second channel is greater than or equal to a first threshold, and a quantity of other terminal devices that perform the Wi-Fi P2P service on a fifth channel is less than the first threshold, switching, by the terminal device from the second channel to the fifth channel to perform the Wi-Fi P2P service.

2. The method according to claim 1, wherein the second channel is a subset of the first channel.

3. The method according to claim 1, wherein frequency ranges of the second channel and the first channel do not overlap.

4. The method according to claim 1, wherein a signal-to-noise ratio and/or a channel load of the second channel meet a second preset condition.

5. The method according to claim 1, further comprising:
when detecting that a signal-to-noise ratio and/or a channel load of the second channel meet the first preset condition and a signal-to-noise ratio and/or a channel load of a third channel meet a second preset condition, switching, by the first terminal device, from the second channel to the third channel to perform the Wi-Fi P2P service, wherein a bandwidth of the third channel is 20 MHz or 40 MHz.

6. The method according to claim 5, wherein frequency ranges of the second channel and the third channel do not overlap.

7. The method according to claim 1, wherein the fourth channel and the first channel are a same channel.

8. The method according to claim 1, further comprising:
receiving, by the first terminal device, first information broadcast by a second terminal device, wherein the second terminal device is configured to perform Wi-Fi P2P service in a Wi-Fi-compatible network, wherein the first information indicates a channel used by the second terminal device.

9. The method according to claim 8, wherein the first information is carried in a beacon frame broadcast by the second terminal device, or the first information is carried in a Bluetooth broadcast frame broadcast by the second terminal device.

10. The method according to claim 1, further comprising: broadcasting, by the first-terminal device, second information indicating a channel used by the first-terminal device.

11. A terminal device, comprising:
one or more processors; and
one or more memories storing one or more programs that, when executed by the one or more processors, enables the terminal device to perform operations including:
receiving, by a terminal device, a first operation input to the terminal device;
determining, by the terminal device, a maximum bandwidth supported by the terminal device;
implementing, by the first terminal device using a first channel, a wireless fidelity peer-to-peer (Wi-Fi P2P) service in response to the first operation using the maximum bandwidth determined by the terminal device as the first channel, wherein the maximum bandwidth of the first channel is 80 MHz or 160 MHZ;
detecting, by the terminal device, that a signal-to-noise ratio and/or a channel load of the first channel meet a first preset condition;
automatically switching, by the first terminal device, from the first channel to a second channel to perform the Wi-Fi P2P service upon detecting that the signal-to-noise ratio and/or a channel load of the first channel meet the first preset condition to continue to perform the Wi-Fi P2P service, wherein a bandwidth of the second channel is 20 MHz or 40 MHZ;
automatically switching from the second channel to the fourth channel to perform the Wi-Fi P2P service when detecting that a signal-to-noise ratio and/or a channel load of the second channel meet the first preset condition and a signal-to-noise ratio and/or a channel load of a fourth channel meet a second preset condition, wherein a bandwidth of the fourth channel is the maximum bandwidth supported by the terminal device;
obtaining, by the terminal device based on the first information, a quantity of other terminal devices that perform the Wi-Fi P2P service on the second channel; and
if the terminal device determines that the quantity of other terminal devices that perform the Wi-Fi P2P service on the second channel is greater than or equal to a first threshold, and a quantity of other terminal devices that perform the Wi-Fi P2P service on a fifth channel is less than the first threshold, switching, by the terminal device from the second channel to the fifth channel to perform the Wi-Fi P2P service.

12. The terminal device according to claim 11, wherein the second channel is a subset of the first channel.

13. The terminal device according to claim 11, wherein frequency ranges of the second channel and the first channel do not overlap.

14. The terminal device according to claim 11, wherein a signal-to-noise ratio and/or a channel load of the second channel meet a second preset condition.

15. The terminal device according to claim 11, wherein execution of the one or more programs by the one or more processors further enables the terminal device to perform operations including:
switching the terminal device from the second channel to the third channel to perform the Wi-Fi P2P service when detecting that a signal-to-noise ratio and/or a channel load of the second channel meet the first preset condition and a signal-to-noise ratio and/or a channel load of a third channel meet a second preset condition, wherein a bandwidth of the third channel is 20 MHz or 40 MHz.

16. The terminal device according to claim 15, wherein frequency ranges of the second channel and the third channel do not overlap.

17. The terminal device according to claim 11, wherein the fourth channel and the first channel are a same channel.

* * * * *